United States Patent
Shiffman et al.

(10) Patent No.: US 11,693,907 B2
(45) Date of Patent: *Jul. 4, 2023

(54) DOMAIN-SPECIFIC NEGATIVE MEDIA SEARCH TECHNIQUES

(71) Applicant: Giant Oak, Inc., Arlington, VA (US)

(72) Inventors: Gary Shiffman, Arlington, VA (US); Jeffrey Borowitz, Arlington, VA (US)

(73) Assignee: Giant Oak, Inc., Arlington, VA (US)

( * ) Notice: Subject to any disclaimer, the term of this patent is extended or adjusted under 35 U.S.C. 154(b) by 80 days.

This patent is subject to a terminal disclaimer.

(21) Appl. No.: 17/140,613

(22) Filed: Jan. 4, 2021

(65) Prior Publication Data

US 2021/0157863 A1 May 27, 2021

Related U.S. Application Data

(63) Continuation of application No. 15/451,069, filed on Mar. 6, 2017, now Pat. No. 10,885,124.

(60) Provisional application No. 62/304,108, filed on Mar. 4, 2016.

(51) Int. Cl.
*G06F 16/00* (2019.01)
*G06F 16/951* (2019.01)
*G06F 16/93* (2019.01)
*G06F 16/33* (2019.01)
*G06F 16/338* (2019.01)

(52) U.S. Cl.
CPC ......... *G06F 16/951* (2019.01); *G06F 16/334* (2019.01); *G06F 16/338* (2019.01); *G06F 16/3344* (2019.01); *G06F 16/93* (2019.01)

(58) Field of Classification Search
CPC ...... G06F 16/951; G06F 16/334; G06F 16/93; G06F 16/3344; G06F 16/338
See application file for complete search history.

(56) References Cited

U.S. PATENT DOCUMENTS

| | | |
|---|---|---|
| 6,199,034 B1 | 3/2001 | Wical |
| 8,417,713 B1 | 4/2013 | Blair-Goldensohn et al. |
| 10,373,067 B1 | 8/2019 | Chen et al. |
| 10,885,124 B2 | 1/2021 | Shiffman et al. |
| 2008/0140684 A1 | 6/2008 | O'Reilly et al. |
| 2010/0205208 A1 | 8/2010 | Walker |
| 2011/0004609 A1 | 1/2011 | Chitiveli et al. |
| 2012/0059838 A1 | 3/2012 | Berntson et al. |

(Continued)

OTHER PUBLICATIONS

Extended European Search Report issued in EP17760984.9 dated Aug. 19, 2019, 7 pages.

(Continued)

*Primary Examiner* — Hung Q Pham
(74) *Attorney, Agent, or Firm* — Fish & Richardson P.C.

(57) ABSTRACT

In some implementations, systems and methods that are capable of customizing negative media searches using domain-specific search indexes are described. Data indicating a search query associated with a negative media search for an entity and a corpus of documents to be searched are obtained. Content from a particular collection of documents from among the corpus of documents is obtained and processed. Multiple scores for the entity are computed based on processing the content obtained from the collection of documents. The multiple scores are aggregated to compute a priority indicator that represents a likelihood that the collection of documents includes content that is descriptive of derogatory information.

19 Claims, 11 Drawing Sheets

(56) References Cited

U.S. PATENT DOCUMENTS

| | | |
|---|---|---|
| 2014/0337257 A1 | 11/2014 | Chatterjee et al. |
| 2015/0081549 A1 | 3/2015 | Kimberg et al. |
| 2015/0095319 A1 | 4/2015 | Ormont et al. |
| 2016/0063110 A1 | 3/2016 | Shoup et al. |
| 2016/0162582 A1 | 6/2016 | Chatterjee et al. |
| 2017/0255700 A1 | 9/2017 | Shiffman et al. |

OTHER PUBLICATIONS

PCT Notification of Transmittal of the International Search Report and the Written Opinion for International Application No. PCT/US2017/020943 dated May 11, 2017, 22 pages.

International Preliminary Report on Patentability in International Appln. No. PCT/US2017/020943, dated Sep. 13, 2018, 12 pages.

CLIENT PORTAL

BATCH MANAGEMENT

| | ENTITY | BATCH | STATUS | LAST UPDATED | PRIORITY INDICATOR |
|---|---|---|---|---|---|
| ☐ | TRADE & CLEAR LTD. | 2016-0002-0001 | READY | FEB. 21, 2016 9:02 PM | 100 |
| ☑ | INDUSTRIAL RESEARCH LTD. | 2016-0002-0001 | IN REVIEW | FEB. 21, 2016 9:02 PM | 93 |
| ☑ | FEDERAL CAPITAL INC. | 2016-0002-0001 | SCORING | FEB. 21, 2016 8:02 PM | 82 |
| ☐ | ABU HAFS THE MAURITANIAN | 2016-0002-0001 | NOT SUBMITTED | FEB. 21, 2016 9:02 PM | 70 |
| ☐ | ABIGAIL TAPIA ORTEGA | 2016-0002-0001 | COMPLETED | FEB. 21, 2016 9:02 PM | 40 |
| ☐ | ABDUR REHMAN | 2016-0002-0001 | PROCESSING | FEB. 21, 2016 9:02 PM | 24 |

FIRST  PREVIOUS  1  2  3  4  5  6  7  8  NEXT  LAST

CLIENT PORTAL | HOME | BATCH MANAGEMENT | + NEW CASE | UPLOAD CASES

- WEB RESULTS — NEW: 60  REVIEW: 1  *(352, 354)*
- SUMMARY

JOHN DOE *(356)*
- CASE #: 8430
- PRIORITY INDICATOR: 100
- DATE SUBMITTED: FEB. 21, 2016
- ADDRESS: 123 K ST NW, WASHINGTON, DC 20005
- PHONE NUMBER: 202-500-1234
- EMAIL ADDRESS: JDOE@GMAIL.COM
- NAME: JOHN DOE
- DATE OF BIRTH: 08/05/1989

60 NEW *(358, 360)*

TREASURY SANCTIONS INTERNATIONAL SYNTHETIC TRAFFICKING *(362)*
HTTPS://WWW.TREASURY.GOV/PRESS-CENTER/PRESS-RELEASES/PAGES/JL2.ASPX
PRESS CENTER HOME » PRESS CENTER ... THE TWO OTHER INDIVIDUALS DESIGNATED TODAY ARE JOHN DOE, ... JOHN DOE. ...

JOHN DOE FACEBOOK, TWITTER & MYSPACE ON PEEKYOU *(362)*
HTTP://WWW.PEEKYOU.COM/DANIEL_LOUIE
PEEKYOU'S PEOPLE SEARCH HAS 58 PEOPLE NAMED JOHN DOE AND YOU CAN FIND INFO, PHOTOS, LINKS, FAMILY MEMBERS AND MORE. NAME, USERNAME, PHONE, SEARCH BY NAME

1 REVIEWED *(364)*

RESOURCE CENTER – U.S. DEPT. OF TREASURY *(366)*
https://www.treasury.gov/press-center/press-releases/Pages/jl2.aspx
OFAC CIVIL PENALTIES AND ENFORCEMENT. ... RESOURCE CENTER. ... DOE, JOHN (A.K.A. DOE, JOHNATHAN, ...

DOMAIN-SPECIFIC NEGATIVE MEDIA SEARCH TECHNIQUES

CROSS-REFERENCE TO RELATED APPLICATIONS

This application is a continuation of U.S. application Ser. No. 15/451,069, filed Mar. 6, 2017, now allowed, which claims priority to U.S. Application Ser. No. 62/304,108, filed on Mar. 4, 2016. The complete disclosures of all of the above patent applications are hereby incorporated by reference in their entirety for all purposes.

TECHNICAL FIELD

This specification generally describes technology related to search engines, and more particularly, to technology related to conducting negative media searches.

BACKGROUND

Negative media searches are often used as due diligence on an entity (e.g., an individual or entity) to screen a variety of media sources to identify negative attributes associated with the entity. For instance, negative media searches can be run on information such as name or address in global news media sources to determine whether an entity is linked with terms that are often associated with negative behaviors or conduct (e.g., criminal acts, bankruptcies, or illicit behavior).

SUMMARY

Many search engine technologies often include a number of limitations when used to perform a negative media search. For example, some search engine technologies are statically configured to crawl a large number of source documents, which often limits their ability to obtain useful information for less-known entities having limited web presences. In addition, because executing a negative media search involves analyzing large volumes of data with different types of information criteria, many search engine technologies often fail to provide enough granular information to enable an end-user to make an informed decision regarding whether the search results include derogatory information.

In some implementations, a negative media search system is capable of customizing a negative media search using different analytical techniques to increase the likelihood of obtaining derogatory information associated with the entity. For instance, the search system can utilize domain-specific indexes to execute a negative search media query in a targeted manner against a set of web sources that are predetermined to be related to the specified domain. In this regard, while a domain-specific search query is used to obtain information from a smaller number of sources compared to a traditional search engine, domain criteria can be specified to obtain a greater number of relevant sources such that a greater portion of relevant information available is captured by the domain-specific query relative to a traditional search query.

After obtaining a set of domain-specific search results, the system then evaluates the relevancy of content obtained from individual search results using a variety of techniques that assess different attributes of the content relative to the executed search query. For example, the system can use natural language processing, similarity calculations, and parametric modeling techniques to compute the variety of scores that reflect different types of relevancy. The various scores are then aggregated using specified weighting factors to compute a priority indicator that reflects an overall likelihood that the set of domain-specific search results include derogatory information that is of interest to an end-user such as a regulator or investigator. The computed priority indicators can then to be used categorize, sort, and/or filter search data for a plurality of entities in order to quickly and efficiently investigate negative media search results for a plurality of entities.

The architecture of the system provides various improvements in executing and processing a search query for performing a negative media search. For example, in many search engine systems, the corpus of documents that are searched include documents that are accessed by a large number of users (e.g., documents that are commonly retrieved in response to prior related queries, etc.). However, these documents are often insufficient to provide the type of results that are needed to enable a user requesting a negative media search for an entity to determine whether the search results include information that is likely to represent derogatory information. The architecture of the present system, however, utilizes domain-specific search indexes that identify a corpus of documents that are predetermined to satisfy criteria of a negative media search. In this manner, the system is capable of executing a search query in a targeted manner within a corpus of documents that are more likely to be relevant to the search criteria than a general corpus of documents (e.g., the top five million popularly searched documents).

In addition, the architecture of the system enables the system to evaluate different types of qualitative information associated with an entity in order to accurately and efficiently identify pertinent information that is likely to represent derogatory information without requiring manual user input. As described in greater detail below, the system utilizes various online behavioral models, statistical and learning techniques, among others, to represent different types entity attributes that are pertinent to a negative media search in user-friendly manner. This enables an end-user to prioritize information that the system determines is likely to include relevant derogatory information.

In one general aspect, a computer-implemented method includes: receiving data indicating (i) a search query associated with a negative media search for an entity, and (ii) a corpus of documents to be searched using the search query, the corpus of documents including documents that are predetermined to satisfy one or more criteria associated with the negative media search for the entity; obtaining content from a particular collection of documents from among the corpus of documents that are determined to be responsive to the search query; processing the content obtained from the particular collection of documents; computing multiple scores for the entity based on processing the content obtained from the particular collection of documents; aggregating the multiple scores to compute a priority indicator, the priority indicator representing a likelihood that the particular collection of documents includes content descriptive of derogatory information for the entity; and enabling a user to perceive a representation of the priority indicator.

One or more implementations can include the following optional features. For instance, in some implementations, processing the content obtained from the particular collection of documents includes: computing, for each document included within the particular collection of documents, a reliability score representing a likelihood that a particular document is associated with the entity; determining that the reliability scores for one or more documents does not satisfy a predetermined threshold; and removing the one or more documents from the particular collection of documents based on determining that the reliability scores for one or more documents does not satisfy the predetermined threshold.

In some implementations, computing the reliability score includes: obtaining one or more text fragments from a particular document; determining a respective topic associated with each of the one or more text fragments; and determining a likelihood that at least one of the topics are associated with the entity.

In some implementations, the method further includes: computing a commonality score that represents a probability that a text fragment corresponding to a name of the entity will be included in a particular document included within the particular collection of documents; and where the reliability scores that are computed for each document included within the particular collection of documents is computed based at least on the computed commonality score.

In some implementations, computing the multiple scores includes computing one or more concept scores that each represent a likelihood that the entity is associated with a predetermined negative attribute of the entity based on processing the content obtained from the particular collection of documents.

In some implementations, the one or more concept scores are computed based at least on determining that the entity is included in a list of sanctioned entities.

In some implementations, computing the multiple scores includes computing, for each document included within the particular collection of documents, a relevancy score representing a likelihood that a particular document includes content that is descriptive of a predetermined negative attribute of the entity.

In some implementations, the method further includes: determining a number of concept scores that satisfy a first threshold value associated with the predetermined negative attribute of the entity; determining a number of documents included within the particular collection of documents that are determined to have a relevancy score that satisfies a second threshold value associated with the predetermined negative attribute of the entity; and where the priority indicator is computed based at least on (i) the number of concept scores that satisfy the first threshold value and (ii) the number of documents included within the particular collection of documents that have a relevancy score that satisfies the second threshold value.

In another general aspect, a computer-implemented method can include receiving a search query associated with an entity; obtaining data corresponding to documents that are determined to be responsive to the search query; receiving data indicating one or more criteria associated with a negative media search; identifying a corpus of documents within the obtained documents that are determined to satisfy at least one of the one or more criteria associated with a negative media search; generating a search index that identifies the corpus of documents; and providing the search index for output to a search engine.

In some implementations, the method further includes: obtaining user input data indicating that one or more documents included in the corpus of documents are determined not to be relevant to the negative media search; and in response to obtaining the user input data indicating that one or more documents included in the corpus of documents are determined not to be relevant to the negative media search, adjusting the search index to identify a corpus of documents that does not include the one or more documents.

In some implementations, the data indicating the one or more criteria identifies a particular type of negative media search that is performed by a regulatory organization.

In some implementations, the corpus of documents includes documents that are predetermined to be associated with the entity.

The details of one or more implementations are set forth in the accompanying drawings and the description below. Other potential features and advantages will become apparent from the description, the drawings, and the claims.

BRIEF DESCRIPTION OF THE DRAWINGS

FIGS. 3A-3C illustrate examples of user interfaces associated with a client portal for reviewing negative media search results.

In the drawings, like reference numbers represent corresponding parts throughout.

DETAILED DESCRIPTION

Figure 1:
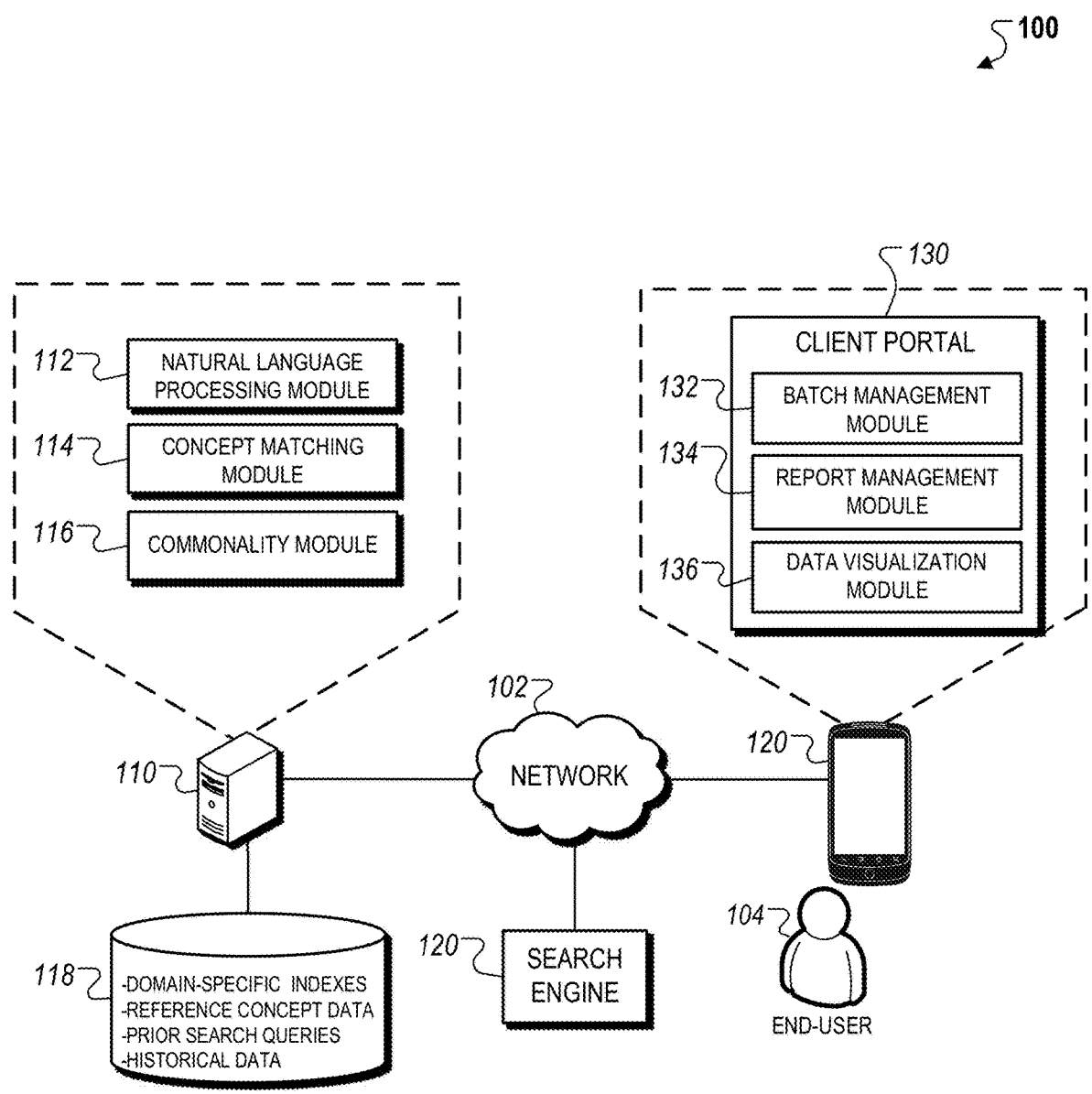
FIG. 1 illustrates an example of a search system.

In general, this specification describes systems and methods that are capable of customizing negative media searches using domain-specific search indexes to more efficiently collect and analyze a larger portion of relevant search results for a target entity. The system can utilize a set of analytical techniques to determine relevancy of information included within the search results to automatically determine derogatory information that is likely to be of interest to an end-user. In this regard, when executing a negative media search for a target entity, the system is capable of gathering a higher portion of relevant search results in a more accurate manner than traditional search engines.

As described throughout, an "entity" refers to an individual or an organization that is the target of a negative media search query by an end-user such as a regulator or investigator. For example, an entity may be a corporation for which a negative media search is run to determine whether the corporation has previously performed any financial activities that are sanctioned by a regulating or prosecuting agency such as the U.S. Department of Justice. In another example, an entity may be an individual that a banking institution runs a background investigation on prior to granting a loan or providing high-security financial services to the individual.

In addition, "derogatory information" refers to information obtained from a set of web sources that indicates potentially negative attributes associated with the target entity of a negative media search. Examples of derogatory information can include data indicating that a target entity has been placed on various flagged lists (e.g., sex offender's list, debtor's list, restricted access lists), or indicators suggesting illicit activity (e.g., arrest records, domestic violence records, etc.), or historical information indicating risk-associated behaviors (e.g., personal accounting history, bankruptcy filings, etc.). In other examples, derogatory information may also refer to negative online activities and behaviors (e.g., explicit or inappropriate comments posted online).

A "domain" refers to a set of questions that a particular end-user wants an answer for in providing a search query. In this context, a "domain-specific index" specifies a collection of documents (e.g., content or webpages) for a specified domain, that is made available for fast and accurate information retrieval in response to executing a negative media search query. In some instances, the domain-specific index can be used to specify access to a structured database that includes information of individuals and organizations that have been sanctioned by governmental and regulatory agencies. In other instances, the domain-specific index can be used to provide information associated with public filings (e.g., filings with the U.S. Securities and Exchange Commission). In this instance, such information can include a list of principals associated with S.E.C. filings, roles of principles within the companies, industries associated with the companies, among other types of data fields that are specific to filing information. In yet another instance, the domain-specific index can include data associated with advertising content. For example, the content can be used to relate a target entity's name to purchasing histories.

As an example, a domain may be related to anti-money laundering (AML) criteria used in financial and legal industries to describe legal controls that require financial institutions or other regulated industries to detect, report, and/or prevent money laundering activities. In this example, a domain specifies the set of criteria required by regulators in executing a negative media search for AML-related activities, and a domain-specific index is used to obtain a collection of documents that are predetermined to be relevant to an AML-interested entity such as an AML officer at a banking institution. The collection of documents can then be used by the AML-interested entity to obtain specific results and/or answers associated with the set of criteria for the negative media search for AML-related activities.

A "domain-specific search query" refers to a targeted and/or customized search query that is executed for retrieval of a collection of documents that are predetermined to be associated with the domain of the domain-specific search query. Compared to a traditional search query, a domain-specific search query is more cost-effective and efficient because the corpus of documents that are searched against the query are only those sources that are predetermined to be associated with the domain, increasing the likelihood of obtaining more relevant and accurate results that are responsive to the search query. For example, although a domain-specific search query is searched against a smaller corpus of content compared to a traditional search query (e.g., a domain-specific corpus vs. a general corpus), because the domain-specific corpus includes documents that are more likely to be relevant, the domain-specific search provides a greater number of relevant search results (with a smaller absolute number of search results). In this regard, domain-specific search queries may be used to reduce the computational and human resources necessary to effectively and efficiently search through large collections of documents for a negative media search.

The search system, as described throughout, computes a variety of "scores" that indicate quantitative and qualitative assessments of the domain-specific search results in different contexts. The individual scores are then used to generate overall insights about a target entity of a negative media search. For instance, as described more particularly below, examples of such scores include concept scores, relevancy scores, reliability scores, among others. Each set of scores is used to reflect an analysis of the search query with respect to the content and information included within the search results in different contexts (e.g., terms associated with an entity, types of documents that specify the entity, a list of other entities that are determined to be similar to the entity inferred from similar web presence, etc.).

As described, a "concept score" refers to a score that reflects the similarity of a set of qualitative attributes between two entities, an entity and a collection of documents, or between two collections of documents. For instance, a concept score can be used to indicate whether the attributes for a target entity for which a negative media search is run is similar to a particular reference entity based on a set of shared attributes between the target entity and the reference entity. Examples of attributes can include demographic and/or classifying information, common behaviors and/or trends associated with an entity, or historical information indicating a set of preferences or associations. In this regard, multiple concept scores can be used to measure similarity in varying contexts, which can be used to identify characteristics of the target entity based on its concepts scores for different reference entities.

By way of analogy, the scores can be used to represent individual compositions of information associated with a web presence of a particular entity. For example, each individual score can be used to quantitatively represent a qualitative aspect and/or attribute of the target entity. In this example, each individual score can be used to reflect a single characteristic or attribute (e.g., financial activity, social media activity, criminal activity, etc.). The individual scores can then be aggregated into a single priority indicator that represents an overall likelihood that the search results of a negative media search include derogatory information that is of interest to an end-user. Because the priority indicator calculation involves aggregating various individual scores, each representing a different aspect of the target entity, the priority indicator can be used to effectively summarize the negative media search results for the target entity. For example, priority indicators can be used to sort different entities such that, during an investigation/analysis by an end-user, the end-user can determine the appropriate amount of time to spend reviewing search results for each entity.

FIG. 1 is a diagram that illustrates an example of a search system 100. The system 100 generally includes an application server 110, a search engine 120, and a client device 120. The application server 110 further includes a natural language processing module 112, a concept matching module 114, a commonality module 116, and stored data 118. The client device 120 provides a client portal 130 for output to an end-user 104. The client portal 130 includes a batch management module 132, a report management module 134, and a data visualization module 136. The end-user can use the client portal 130 to perform various actions relating to executing a negative media search as described in greater detail below.

The application server 110 can be an electronic device configured to provide search services by exchanging communications with the search engine 120 and the client portal 130 over the network 102. The application server 110 can also utilize the data 118 to provide information to an end-user 104 on the client portal 130. The application server 110 can also receive search queries from the client portal 130, pre-process the search query using the data 118, and then execute the query using the search engine 120 and obtain a set of search results responsive to the search query. A more detailed description with respect to query processing and search results filtering techniques used by the application server 110 is described with respect to FIGS. 2A-2D.

The natural language processing (NLP) module 112 of the application server 110 is generally used to analyze the search query against the content of documents and/or web pages included in the obtained search results. For instance, the NLP module 112 can include one or more statistical or machine learning algorithms that are configured to derive statistical inferences from content that is determined to be associated with an entity of a negative media search. Examples of such techniques can include word and sentence tokenization, text classification, sentiment analysis, information extracting, parsing, and meaning extraction.

The NLP module 112 is also used to apply computational models to individual terms, sentence fragments, or sets of related terms from documents in order to disambiguate between contexts related to the presence of entity information on a particular document or webpage. For example, such techniques can be used to identify different contexts in which a single term can be used within a document or webpage (e.g., "food court" vs. "court of law"). In another example, the NLP module 112 can determine a specific context describing how entity information is included within a particular document or webpage (e.g., an entity authoring publications about drug trafficking, but not being accused of the act of drug trafficking).

The concept matching module 114 of the application server 110 is generally used to compute a set of concept scores that represent individual attributes of an entity based on the entity information identified within the documents of the obtained search results. For example, as described more particularly with respect to FIG. 2A, the concept scores can be used to indicate whether the target entity is similar to a set of reference entities that each have a set of predetermined attributes (e.g., sex offender's list, debarred attorneys, debtor's list). In these examples, the concept matching module 114 compares information extracted from the search results against a reference dataset that includes a plurality of reference entities that have varying attributes. In this regard, the concept matching module 114 computes concept scores by analogizing different aspects of the entity information included within the search results to reference information with a set of predetermined attributes.

The commonality module 116 of the application server 110 is used to identify related entities that are determined to be similar to the target entity. As an example, if the entity is an individual, related entities can be other individuals with the same name, or closely associated entities (e.g., family members, co-workers), who have a web presence that can potentially lead to non-specific information about the entity being included within the search results for the negative media search. In the example above, the commonality module 116 can be used to identify individuals with the same name as the entity to be searched, and then remove specific documents that reference entity information associated with the related entities. In this regard, the commonality module 116 utilizes a set of filtering techniques to distinguish between similarly appearing entities in order to increase the accuracy of the entity information included within the negative media search results.

The stored data 118 includes a variety of information that is used by the application server 110 in order to process a negative media search query, obtain search results responsive to the query, extract information from documents included within the search results, and/or process the extracted information using the NLP module 112, the concept matching module 114, or the commonality module 116. For example, as depicted in FIG. 1, the stored data can include specific domain-specific indexes, reference concept data, prior negative search queries submitted to the search engine 120, or other types of historical data. More particular descriptions with respect to the specific data types, and how they are utilized by the application server 110, are provided with respect to FIGS. 2A-2D.

The search engine 120 can be a software system that includes a search infrastructure for receiving a negative media search query and designed to search for information on a set of predetermined Internet sources that is specified by the domain-specific search index. In addition, the search engine 110 can be implemented in software, firmware, hardware, or any combination of software, firmware, or hardware.

As depicted in FIG. 1, the search engine 120 can be configured to operate on a separate web server (not shown) that is independent of the application server 110. For example, the search engine 120 can be a commercially available search engine that is provided by a search provider and enables the execution of a negative search engine query over a web browser running on a remote client device of the client portal 130. In such examples, the search engine 120 can be configured to perform a domain-specific search using domain-specific indexes received from the application server 110. The search results obtained by the search engine 120 can then be transmitted to application server 110 over the network 102 for processing. Alternatively, in other implementations, the search engine 110 can be integrated into the application server 110 as a specific software module. In such implementations, the configuration settings of the search engine 120 can be adjusted by the application server 110 prior to executing a negative media search query.

The client device 120 can be any type of personal electronic computing device that is capable of running an application. For example, the client device 120 can be one or more of a mobile computing device, personal digital assistant (PDA), a cellular telephone, a smartphone, a tablet computing device, a laptop computing device, an electronic wearable device, among other types of electronic devices. The client device 120 exchanges communications with the application server 110 to obtain, for example, data indicating search results obtained in response to submitting a search query relating to a negative media search, data associated with the search results (e.g., documents obtained in response to the search query), or configuration data for the client portal 130 and/or its components.

The client portal 130 can be a software interface that is provided to the client device 120 by the application server 110. In some implementations, the client portal 130 is a web-based interface that is accessed on a web browser of the client device. In such implementations, the application server 110 can be configured to provide web services to the client device 120 over the network 102.

In other implementations, the client portal 130 is provided through the use of a software application such as a desktop application or a mobile application. In such implementations, the client portal 130 can be provided as an application package interface (API) associated with an analytics software suite. In some instances, the client portal 130 can be a software extension to third-party software for performing negative media searches. In such instances, the client portal 130 can be used to perform data mining techniques on a set of raw negative media search results generated from a third party searching application.

Access to the client portal 130 can be provided to the end-user 104 as a subscription service. For example, access can be provided to individual end-users, or to organizations and government agencies whose employees are end-users. An end-user 104 can be provided with a set of user credentials (e.g., username and password) to access the client portal 130 on a client device.

The batch management module 132 can be a software module of the client portal 130 that enables an end-user 104 to upload data to be visualized and analyzed on the client portal 130. The uploaded data can include entity information, previously obtained search results data, or other types of raw data to be processed. In addition, the batch management module 132 enables the end-user 102 to upload data for a plurality of entities with a batch upload so that data for the entities can be visualized simultaneously within a single interface as depicted in FIG. 3A. In one example, priority indicators of individual entities can be compared so that the end-user can determine/allocate the appropriate amount of time to review the data for particular entities.

The report management module 134 can be a software module of the client portal 130 that can be used to compile information from search results obtained for negative media search queries for entities to a summary report. For instance, as depicted in FIG. 3B, the summary report can include a list of top search results, a computed priority indicator for the entity, and/or a category assigned to each relevant top result (e.g., relevant, irrelevant, or requires more research). The report management module 134 can also be used to generate multiple reports for batch submissions.

Figure 3C:
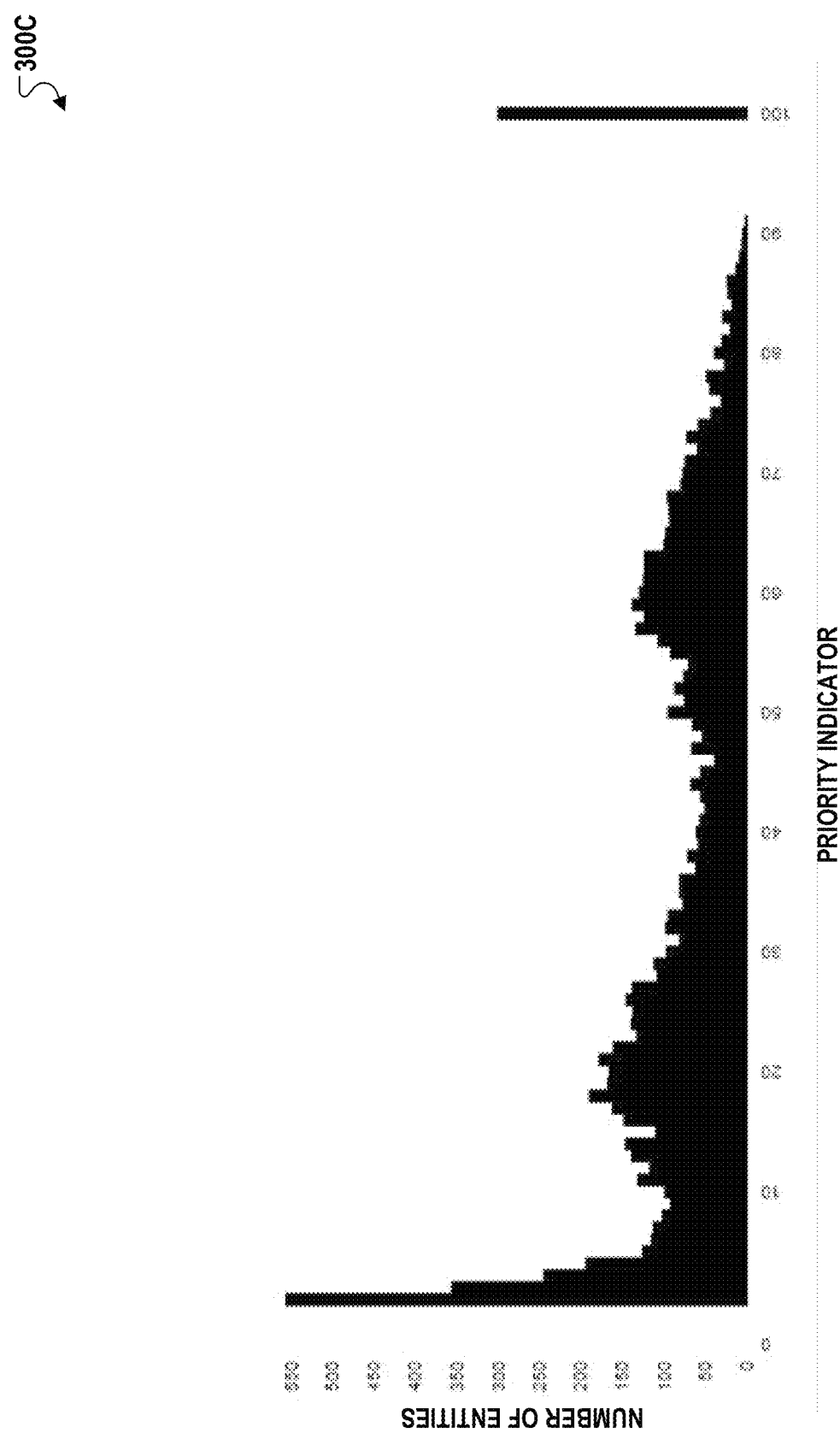

The data visualization module 136 can be a software module that includes a variety of data analytics toolkits used to visualize raw data uploaded to the client portal 130 using the batch management module 132. For instance, an example of a data visualization is depicted in FIG. 3C. As depicted, the visualization represents a distribution of computed priority indicators for different entities. In this example, the visualization enables the end-user 104 to identify groups of entities with high priority indicators (e.g., entities whose search results are likely to include derogatory information), and identify groups of entities with low priority indicators (e.g., entities whose search results are not likely to include any derogatory information). In this regard, the end-user 104 can then filter the data displayed on the client portal 130 by priority indicator value (e.g., display only entities with priority indicators between 70 and 100). This further provides the end-user 104 with useful information as to how much manual review of the search results is necessary to obtain accurate results.

In addition to the functionalities described above, the client portal 130 allows an end-user to interact with the search results data in order to generate insights associated with search results for entities. For example, the end-user 104 can filter the raw batch data by different data categories (e.g., data range, name, status, batch, ranking, priority indicator range, etc.). In other examples, the end-user 104 can review and provide user inputs to categorize (or "resolve") individual search results that are selected to be displayed for a particular entity by the system 100. As described previously, such user inputs can include indications as to whether a particular search result is relevant, not relevant, or requires additional research. These indications can then be used to reorganize data visualizations that are presented to the end-user 104.

In some implementations, user inputs provided by different end-users 104 on the client portal 130 are collected by application server 110 and used as a crowd-sourced feedback to refine and improve subsequent negative media search queries that are run by the system 100. In one example, classifications for individual search results for an entity can be used to compute a quality metric that represents the responsiveness of the search results to the negative media search query (e.g., large number of "relevant" classifications indicating high responsiveness, large number of "not relevant" classifications indicating low responsiveness). In this example, the quality metric can be used to refine the domain-specific search index for subsequent search queries in order to reduce the likelihood of obtaining content from web pages that were previously classified as "not relevant," and increase the likelihood of obtaining content from web pages that were previously classified as "relevant."

In some implementations, the domain for the negative media search query can be dynamically trained to more accurately obtain information over time. For instance, after classifying a set of search results documents as "relevant or "not relevant," information associated with each group of documents can be used to build a statistical model to predict the relevance of subsequent search relevant that share similar characteristics to the documents in each group of documents. Such information can include the source where the documents were obtained from (e.g., public records, social media network profile, etc.), whether the content actually includes the target entity name as opposed to other types of entity information, whether the documents include links that have a set of control terms, or whether the documents include terms or other natural language processing features.

In another example, the user inputs provided by different end-users 104 can be used as confirmatory responses of the different processing techniques performed by the NLP module 112, the concept matching module 114, and the commonality module 116. For instance, the application server 110 can compute a baseline relevancy score for each a particular search result source across various queries using techniques described previously, and then compare the baseline relevancy score against relevancy indications by different end-users 104 when the particular search result is shown on the client portal 130. In this example, if a particular search result is consistently identified by end-users 104 as being relevant, then the components of the application server 110 can be trained to prioritize the source of the particular search result within subsequent queries, or include the source within the reference dataset utilized by the concept matching module.

Figure 2A:
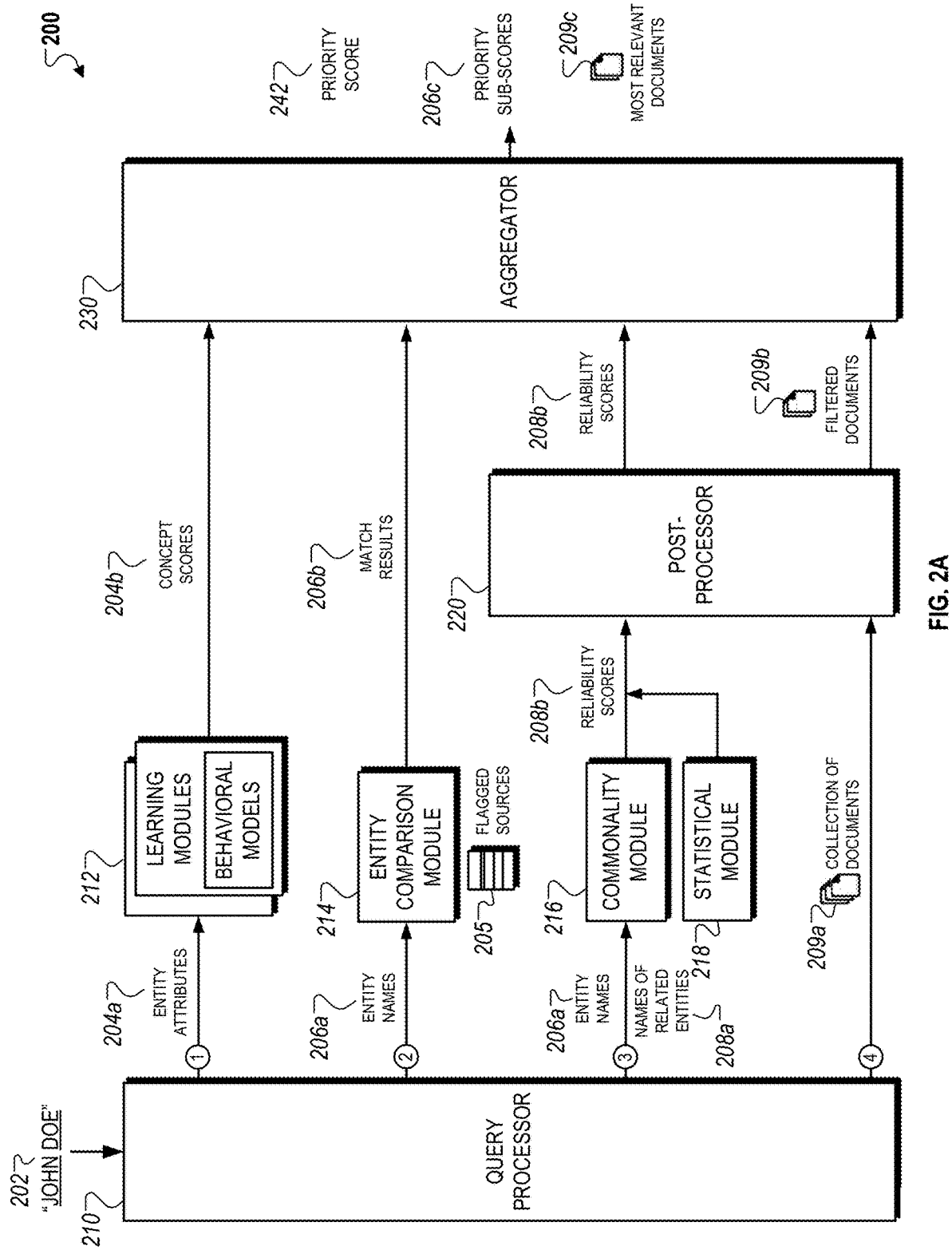
FIG. 2A illustrates an example of an architecture of a search system that can be used to compute a priority indicator for an entity.

FIG. 2A is a diagram that illustrates an example of an architecture 200 for computing a priority indicator for an entity. In general, the priority indicator represents a likelihood that documents (e.g., webpages) included within search results provided in response to a conducting negative media search for a target entity includes derogatory information associated with the target entity. In this regard, a high priority indicator indicates a high likelihood that at least some of the information obtained from the search results will include derogatory information that is of interest to an end-user such as a regulator or an administrator that obtains the negative media search results. Alternatively, a low priority indicator indicates a low likelihood that there is any derogatory information associated with the target entity.

The architecture 200 can generally be executed by a component of the application server 110, such as the NLP module 112, the concept matching module 114, and the commonality module 116, or a combination thereof. Alternatively, in some implementations, portions of the architecture 200 may be executed by separate components that either exchange data communications with the application server 110 over the network 102 (e.g., the search engine 120 or a client device of the end-user 104), or other computing devices independent of the system 100 that are configured to exchange communications with the application server 110.

Referring to the figure, the query processor 210 receives a negative media search query 202 as input. The query processor 210 processes entity information included within the input query 202 (e.g., entity name) and obtains a set of domain-specific search results using the domain-specific index described above. In the example depicted, query processor 210 processes the input query 202 for an individual named "JOHN DOE" and obtains all search results within a particular domain that include terms "JOHN," "DOE," and "JOHN DOE."

After receiving the search query 202, the query processor 210 processes the search query 202 according to multiple data processing pathways to compute a priority indicator. In the example depicted, the architecture 200 generally specifies four processing pathways, which involves a different aspect relating to the computation of the priority indicator. In this example, each pathway is identified by a number (e.g., a first pathway corresponding to "(1)," a second pathway corresponding to "(2)," a third pathway corresponding to "(3)," and a fourth pathway corresponding to "(4)").

Each pathway represents a distinct analytical technique that is used evaluate a web presence of the target entity (e.g., the individual named "JOHN DOE"). In this context, a "web presence" refers to a collection of documents that are obtained responsive to the search query 202 and are determined to be associated with, or corresponding to, the target entity (e.g., webpages where the entity is mentioned, public records associated with the entity, among others).

In the first pathway, the system evaluates online behavior of the target entity in relation to a set of behavioral models that each specify a particular negative online behavior (e.g., online behaviors of individuals that were determined to be sex offenders, arrested for drug offenses, or to have filed for bankruptcy). When proceeding along this pathway, the system computes a set of concept scores 204b based on the entity attributes 204a using a plurality of learning models 212.

In the second pathway, the system determines whether the target entity is present within a designated list of entities that are known to have negative attributes (e.g., individuals that are listed on a sanctioned program list of the U.S. Treasury Department). When proceeding along this pathway, the system determines if the target entity is included in a list of flagged sources 205, and generates a set of match results 206b using an entity comparison module 214.

In the third pathway, the system determines a commonality of the entity's name in order to identify a likelihood that documents obtained are actually associated with the target entity and not similarly-named entities (e.g., documents obtained by another individual named "JOHN DOE" that is not the subject of the search query 202). When proceeding along this pathway, the system compares entity names 206a identified by the search query 202 against a set of related entity names 208a using a commonality module 216 and a statistical module 218.

In the fourth pathway, the system obtains and processes a collection of documents that are determined to be responsive to the search query 202 (e.g., webpages that include a text segment that is related to the text of the search query, or documents that are expected to be associated with the target entity). When proceeding along this pathway, the system searches a corpus of documents that are associated with a specified domain. As described throughout, the corpus of documents includes documents that are predetermined to be associated with a particular domain-specific search index. The system applies the search query 202 to the corpus of documents to identify a collection of documents a collection of documents 209a that are determined to be responsive the search query 202. The collection of documents 209a can be obtained using, for example, a search engine (not shown) that is trained to obtain documents that include text fragments that correspond to, or relate to, text within the search query 202 and/or search information associated with the search query 202.

In some implementations, the system additionally, or alternatively, obtains information associated with the collection of documents 209a. For example, the system can obtain metadata identifying content included within the collection of documents 209a, and/or other types of associated information (e.g., document locations, unified resource locater (URL) addresses, content that is identified within the collection of documents 209a, etc.).

Referring in greater detail to the first pathway, the system identifies a set of entity attributes 204a for the target entity based on the input query 202. For instance, the entity attributes 204a can include context data such as geographic location, prior webpage data, etc., as well as qualitative characteristics associated with the target entity (e.g., entity name, demographic information, etc.). As an example, for a target entity that is an individual, such qualitative characteristic can include gender, age, political affiliations, occupation, or ethnicity, and the like. In another example, for a target entity that is an organization, these characteristics can include company size, principle place of business, industries involved in, etc.

The system provides the entity attributes 204a as input to a set of learning modules 212, which compare the entity attributes 204a to various datasets that include reference attributes for a plurality of reference entities. The learning modules 212 can be a set of machine learning or data mining algorithms that generally use learning methods (e.g., random forest decisions) for classification, regression, and other types of statistical analyses of the entity attributes 204a in relation to the reference dataset. In some implementations, the learning modules 212 can be dynamically configured to combine different parametric modeling techniques for different types of negative media searches executed for a given input query 202.

The system can use the learning modules 212 to compare attributes of a target entity to sets of predetermined attributes of reference entities within the reference dataset. For instance, the reference dataset can include reference entities with different types of characteristics (e.g., regulation compliant entities and non-compliant entities). In this regard, the concept scores 204b computed by the learning modules 212 reflect similarity determinations between the target entity and each of the reference entities included within the reference dataset.

Referring now to the second pathway, the system determines whether the target entity has been included in a designated list of entities that are predetermined to have negative attributes as described above. The system uses the entity comparison module 214 to obtains the lists from the set of flagged sources 205. The flagged sources 205 can be refer to document repositories that store lists of entities that are tagged with derogatory information. In some instances, the flagged sources 205 can also provide references to files associated with a target entity stored on a proprietary data-based on a remote server.

The entity comparison module 214 obtains entity names 206a associated with the target entity from the input query 202 and cross-references the obtained entity names 206a against the information included within the flagged sources 205 in order to generate the match results 206b. In one example, if the entity comparison module 214 determines a match between the entity names 206a and the information included within one or more of the flagged sources 205 (e.g., indicating that the target entity has been listed on a designated list specified within the flagged sources 205), the entity comparison module 214 extracts the matching information from the applicable flagged source and includes the information in the matching results 206a.

The system uses the results of the entity matching technique to compute the priority indicator 242, and determine the most relevant documents 209c, which are described in greater detail below with respect to FIGS. 2B-2D. For example, if the match results 206b indicates a match to one of the flagged sources, then the priority indicator 242 for the target entity can be automatically increased to indicate to an end-user that the search results most likely include derogatory information associated with the matched source from the list of flagged sources 205. Likewise, the content from the flagged source can additionally be included within the most relevant documents 209c given the match determined by the entity comparison module 214.

Referring now to the third pathway, the system processes the entity names 206a and identifies names of related entities 208a (e.g., other individuals that share the same or similar names as the target entity). The system uses the commonality module 216 and/or the statistical module 218 to analyze and/or determine one or more commonality metrics for the entity names 206a. For instance, the commonality metrics can represent a determined frequency with which the entity name 206a is to occur in any given document. For example, a high frequency parameter indicates that the entity name 206a is a very common, and therefore, a documents that include text fragments identifying the entity name may have a high likelihood of actually referring to a related entity that is not the target entity.

As an example, the commonality metrics for a target entity that is an individual can specify the commonness of the individual's first name, which is determined using social security data, or commonness of the individual's last name, which is determined from census data. In other examples, the commonality metrics for a target entity that is an organization can be the commonness of organization-specific terms (e.g., copyrights, trademarks, marketing slogans) in a repository of search queries for companies within a specific geography or industry.

The commonality module 216 then computes a set of reliability scores 208b for the entity names 206a based on the commonality measurements for the target entity. The reliability score 208b reflects an assessment that a particular search result webpage that is obtained in response to the input query 202 includes information that is actually associated with the target entity. The reliability score 208b calculation can further be tuned to be more or less sensitive based on the commonality metrics that are computed by the commonality module 216. For example, if the commonality metrics indicate that the name of the target entity is very common within a corpus of documents (e.g., a name that resembles the name of a celebrity), then the reliability score 209a calculation can be made sensitive such that a greater amount of information (e.g., more text) is obtained and analyzed from each document within the collection of documents 209a to reduce the likelihood of false positive associations with the target entity.

The reliability score 208b calculation is further augmented by the use of the statistical module 218, which implements techniques that further determine whether the information within a document is actually associated with the target entity. For instance, the statistical module 218 can use extrinsic data such as the number of clicks delivered by other users on the webpage, the location on a webpage where the target entity information was found, among other types of indicators, to predict whether the information is accurately associated with the target entity.

Techniques used by the statistical module 218 can either be cross-referenced against the commonality metrics computed by the commonality module 216 in order to verify the reliability scores 208b, or combined with the commonality measurements in order to adjust the calculation of the reliability scores 208b.

Referring now to the fourth pathway, the system obtains the collection of documents 209a that are determined to be responsive to the search query 202. As described above, the collection of documents 209a can include webpages that include text corresponding to, or relating to, a text segment of the search query 202, webpages that include information relating to the target entity, or other types of files that are extracted based on processing the search query 202 using a search engine.

The search engine can a domain-specific search index, as described above, to obtain a collection of documents that are determined to have a higher degree of relevancy to the negative media search criteria than a general search query. For example, if the specified negative media search is to identify money-laundering activities by the target entity, then the search engine may search a corpus of document that are predetermined to relate to money-laundering activities, and then identify the collection of documents 209a within the corpus that are identified as being responsive to the search query 202. Alternatively, in other implementations, the system applies a general search engine that does not use a domain-specific search index to obtain the greatest number of documents that are responsive to the search query. In such implementations, the domain-specific index can be applied at a later processing stage as illustrated in FIG. 2D.

The system processes the output of the four pathways described above using the post-processor 220 and the aggregator 230. As depicted, the system provides the concept scores 204b and the match results 206b, representing the outputs of the first and second pathways, respectively, to the aggregator 230. The system also provides the reliability scores 208a and the collection of documents 209a, representing the output of the third and fourth pathways, respectively, to the post-processor 220. The post-processor then uses the reliability scores 208b to filter the collection of documents 209a to remove documents that are determined to be either irrelevant and/or unreliable. The post-processor 220 then provides the reliability scores 208b and the filtered documents 209b to the aggregator 230.

The aggregator 230 combines the various inputs from the different pathways (e.g., the concept scores 204b, the match results 206b, the reliability scores 208b, the filtered documents 209b) to compute an overall priority indicator that represents a likelihood that the output of the negative media search includes some type of derogatory information associated with the target entity.

The aggregator 230 also generates a set of priority sub-scores 206c that represent other types of scores, such as the concept scores 204b, the reliability scores 208b, or other intermediate scores that are used to compute the priority indicator 242. In this regard, the priority sub-scores 206c can provide granular contextual information of the target entity's web presence to the end-user, which may not entirely be reflected in the value of the priority indicator 242.

In addition, the aggregator 230 uses the various types of information indicated by the concept scores 204b, the match results 206b, and the reliability scores 208b to identify most relevant documents 209c from among the filtered documents 209b. The most relevant documents 209c represent documents that are determined to have the highest likelihood of including derogatory information that is associated with the target entity. In this regard, while the filtered documents 209b represent documents with a high degree of reliability (e.g., documents that are likely to be associated with the target entity and not a related entity), the most relevant documents 209 are documents that are both determined to be reliable and are also related to the negative media search query (e.g., documents that are determined to be likely to include derogatory information).

In various implementations, the aggregator 230 may perform various optional operations that either support or augment the calculation of the priority indicator 242, the priority sub-scores 206c, and/or the identification of the most relevant documents 209c. For instance, in some implementations, the aggregator 230 sets a predetermine value if certain determinations are made irrespective of the operations performed in some or all of the pathways. For example, the aggregator 230 may set the priority indicator to a maximal value (e.g., a value of "100") if the match results 206b indicates that the target entity is listed within one of the flagged sources 205. In this example, the value of the priority indicator is assigned irrespective of the values of the concept scores 204b, the values of the reliability scores, and/or the contents of the filtered documents 208b. As another example, the aggregator 230 may set the priority indicator 242 to a minimal value (e.g., a value of "0") if an application of the search query 202 fails to provide any documents, or if the all of the documents included within the collection of documents 209a are determined by the post-processor 220 to be unreliable (e.g., having respective reliability scores that fail to satisfy a predetermined threshold value for reliability).

In some implementations, the aggregator 230 may up-weight or down-weight a baseline value computed for the priority indicator 242 based on analyzing the different inputs received. For example, if the most relevant documents 209c include documents that have a reliability score that fails to satisfy a secondary threshold value (e.g., a threshold value higher than the one used by the post-processor 220 to identify the filtered documents 209b from the collection of documents 209a), then the aggregator 230 may determine that the most relevant documents 209c are not as likely to include derogatory information, and as a result, down-weight the computed value of the priority indicator 242.

In some implementations, the aggregator 230 adjusts baseline values of the concept scores 204b and/or reliability scores 208a based on processing content obtained from the filtered documents 209a, the most relevant documents 209c, or both. For example, if a large portion of the filtered documents 209b are determined to be irrelevant (e.g., reliable but not related to the negative media search criteria), then the aggregator 230 may adjust the values of the concept scores 204b.

In some implementations, in addition to adjusting the value of the different scores, the aggregator 230 can also uses domain-specific weights for each of the concept scores 204b that are used by the aggregator 230 to combine individual concept score values into the priority indicator 242. For example, different concept scores may be computed for different concept pairs that share a single reference entity (e.g., Specially Designated Nationals (SDN) list and N.Y. Stock Exchange companies as one pair, and SDN vs. NASDAQ companies as another pair). For these examples, the aggregator 230 computes a combined concept score for each concept pair by combining the two concept scores for the respective reference entities within each pair. The aggregator 230 then combines the values of the revised concept scores using specific weighting factors to generate an overall priority indicator 242 for the target entity.

In some implementations, the aggregator 230 computes priority sub-scores that indicate characteristics of the target entity indicating that the target entity is more similar to reference entities that have been predetermined to be associated with derogatory information (e.g., entities that have been placed on a national sanctions list), and/or less similar to reference entities that are not associated with derogatory information (e.g., entities that are included in a list of publicly traded information). In such implementations, the priority sub-scores can be customized based either on the domain associated with the negative media search query, or the requirements of the particular end-user 104 running the negative media search query. For example, the system can identify lists of entities that have specific attributes of interest to the end-user 104, lists of entities that are not relevant to the attributes of interest, and then compare the priority sub-scores for entities within each of these lists to differentiate between the two lists.

The system can execute the operations associated with the four pathways illustrated in FIG. 2A in a variety of configurations. In some implementations, system performs the operations associated with the four pathways are performed in parallel as shown in FIG. 2A (e.g., performing operations associated with multiple pathways within a specified period of time). In other implementations, the system performs the operations sequentially (e.g., performing all of the operations of an individual pathway, and then providing the output of the performed operations as an input for performing the operations of another individual pathway). In some other implementations, the system may perform a combination of parallel and sequential operations (e.g., performing the operations of pathways (1) and (2) in parallel, the output of which are then provided as input to the operations of pathway (3), which is sequentially performed prior to performing the operations of pathway (4)). In this regard, the operations performed within an individual pathway can be used to adjust the operations performed in other individual operations. More detailed examples of this concept are described below with respect to FIGS. 2B-2D.

As a further illustration, in one particular implementation, the output of the commonality module 216 is provided as input to the entity comparison module 214, and then subsequently to the learning modules 212. In this example, the operations of the first pathway are initially used to disambiguate between the search results of the target entity and the search results of related entities (e.g., different entities with the same name, or associated entities) that are included within the collection of documents 209a. After filtering the collection of documents 209a and discarding the non-specific search results, the entity comparison module 214 then determines whether the target entity has been listed on one of the flagged sources 205. If the entity has been identified on such a list, then the operations of the third pathway are skipped as the aggregator 230 automatically specifies a predetermined value for the priority indicator 242 based on the entity's presence within one of the list of flagged sources 205. Alternatively, if the match results 206b do not indicate such a presence on one of the flagged sources 205, then the system proceeds with the operations of the first pathway and computes the set of concept scores 204b using the learning modules 214. In this regard, different pathway configurations can be used to customize the computation of a priority indicator based on a particular domain, a specific target entity for which the query 202 is run, and/or the requirements of the end-user 104 that requests the negative media search.

Figure 2B:
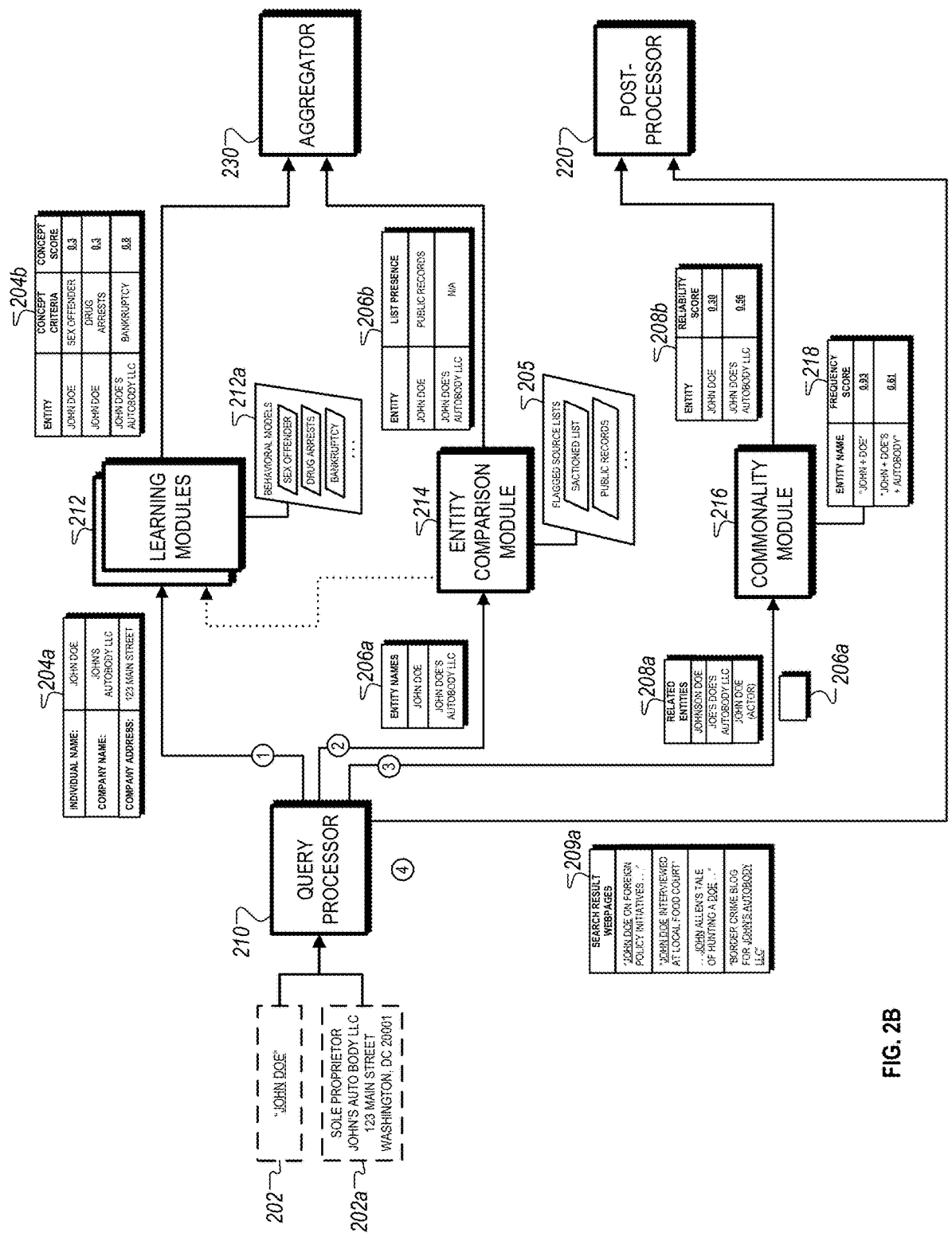
FIGS. 2B-2D illustrate an example of negative media search performed by a search system using the architecture illustrated in FIG. 2A.
Figure 2C:
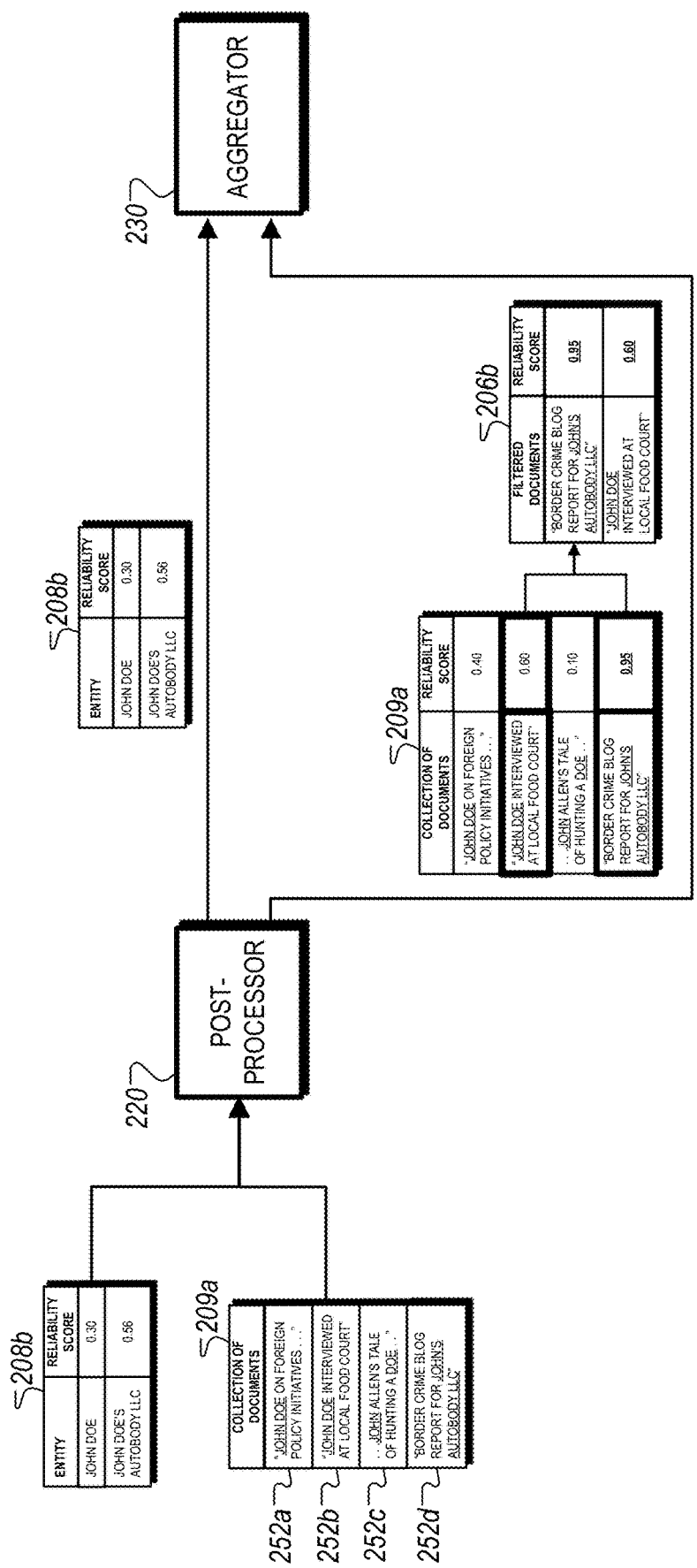
Figure 2D:
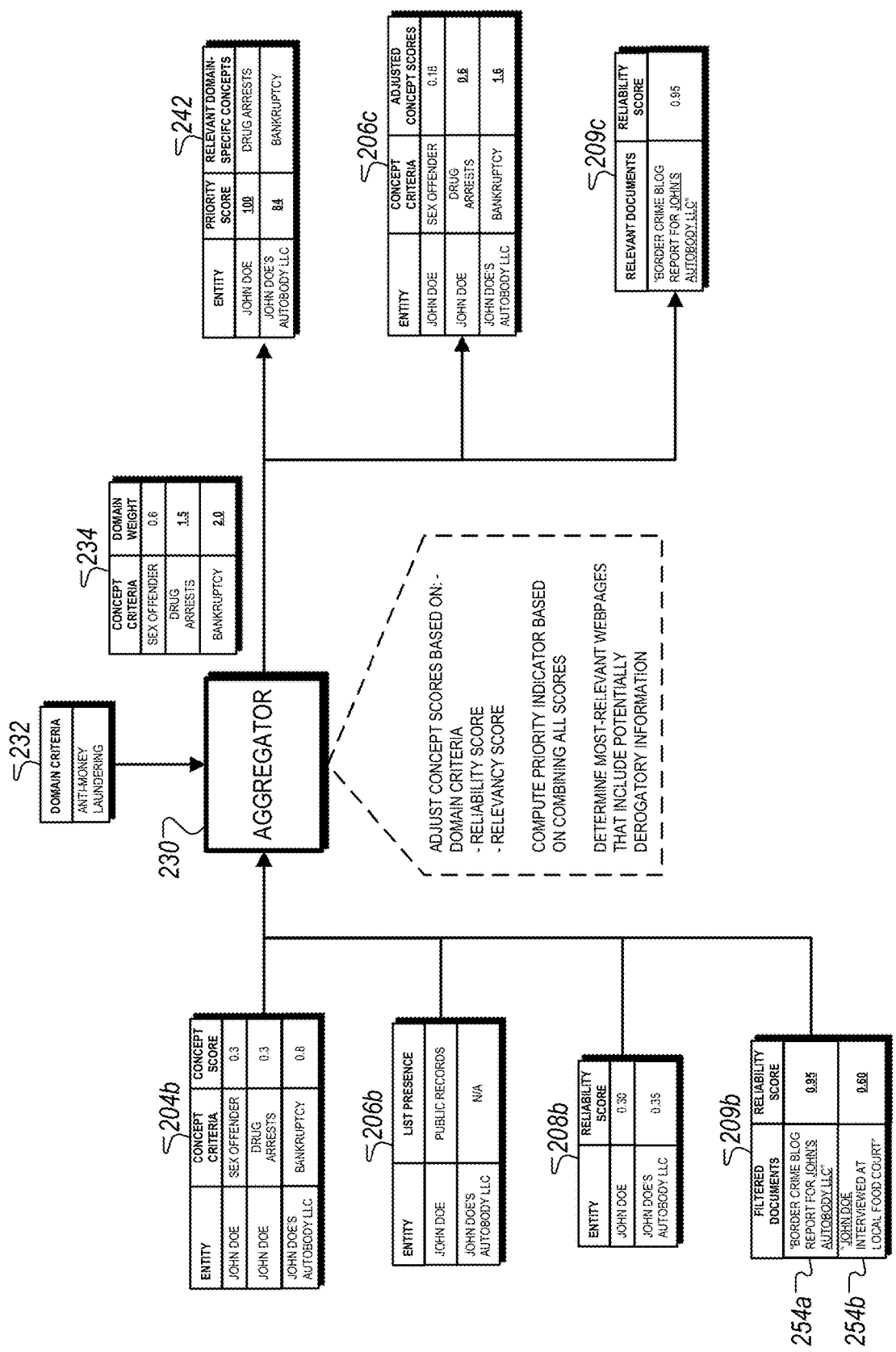

FIGS. 2B-2D illustrate an example of a negative media search performed by a search system using the architecture illustrated in FIG. 2A. In particular, FIG. 2B illustrates exemplary operations performed by the query processor 210, FIG. 2C illustrates exemplary operations performed by the post-processor 220, and FIG. 2D illustrates exemplary operations performed by the aggregator 230.

Referring initially to FIG. 2B, the illustrated example generally relates to performing a negative media search for a target individual named "JOHN DOE." The query processor 210 receives the query 202, which represents a text fragment "JOHN DOE" identifying the name of the target individual, and associated query information 202a. In this example, the query information 202a indicates that the target individual is a sole proprietor of a limited liability company, "JOHN DOE'S AUTO BODY LLC," which is located at the address "123 MAIN STREET, WASHINGTON, D.C., 20001."

Upon receiving the search query 202 and the query information 202a, the query processor 210 performs operations relating to the four pathways illustrated in FIG. 2A and described above. With respect to the first pathway, the query processor identifies the entity attributes 204a. In this example, the query processor 210 identifies two entities associated with the query 202 (e.g., the individual named "JOHN DOE," and the company named "JOHN DOE'S AUTO BODY LLC"). The entity attributes 204a include "INDIVIDUAL NAME," "COMPANY NAME," and "COMPANY ADDRESS," which are provided as input to the learning modules 212.

The learning modules 212 determine online activity associated with each entity identified within the entity attributes 204a. For examples, the learning modules 212 identify online activity associated with the two entities (e.g., online transactions associated each entity, search results submitted by the two entities, online activity on a website associated with the two entities, financial transactions from recent online bank records, etc.). The online activity is then compared to a set of behavioral models 212a, which includes models for a particular attribute or characteristic associated with a group of entities that are determined to share the particular attribute or characteristic. For instance, in the example depicted, the behavioral models 212a specify different models for "SEX OFFENDER," "DRUG ARRESTS," and "BANKRUPTCY." In this example, each model includes online activity of entities that were predetermined to have the similar attributes. For instance, the "SEX OFFENDER" model can include activity data of individuals that are listed on a public sex offender list as a result of a conviction for sexual assault. Likewise, the "BANKRUPTCY" model includes online activities for individuals and companies that have recently filed for bankruptcy.

In some implementations, the behavioral models 212a can include other types of behavioral models that are not illustrated in FIG. 2B. Other examples of behavioral models can include behavioral models for entities that are predetermined to have positive attributes. In such implementations, the behavioral models 212a can include behavioral models for negative attributes, as illustrated in FIG. 2B, as well as positive attributes (e.g., a behavioral model for entities that have received awards and/or accolades).

The learning modules 212 compare the online activities of the target entities (e.g., "JOHN DOE" and "JOHN DOE'S AUTOBODY LLC") with the online activities specified within each model to compute the concept scores 204b. In this example, a concept score represents a determination that a target entity shares a set of qualitative attributes with other entities that are specified by the behavior models 212a. For instance, in the example depicted, the learning modules 212 determine that the individual "JOHN DOE" has a concept score of "0.3" for the concept criteria "SEX OFFENDER" and "DRUG ARREST." In this example, these values can represent, for instance, a 30% confidence that "JOHN DOE" has similar qualitative attributes to other individuals that are known to be sex offenders and/or have been arrested for drug-related offenses. The learning modules 212 also determines that the company "JOHN DOE'S AUTOBODY LLC" has a concept score of "0.8" for the concept criteria "BANKRUPTCY." In this example, this value can represent, for instance, an 80% confidence that "JOHN DOE'S AUTOBODY LLC" has similar qualitative attributes to other companies that have previously filed for bankruptcy.

With respect to the second pathway, the query processor 210 identifies entity names 206a associated with the search query 202, which includes one entity name for the individual "JOHN DOE" and another entity name for the company "JOHN DOE'S AUTOBODY LLC." The entity comparison module 214 then determines if these entity names are present within the flagged sources 205. In this example, the flagged sources specify two lists of entities, a "SANCTIONED LIST," which includes, for example, entities that have been sanctioned by the U.S. Department of Treasury for violations, and "PUBLIC RECORDS," which includes lists of individuals in particular jurisdictions that have been convicted of a felony offense.

In some implementations, the flagged sources 205 can include other types of lists and/or sources that are not depicted in FIG. 2B. For instance, the flagged sources 205 can include sanctioned lists from different countries and/or geographic regions (e.g., different state-level sanctioned lists, or international sanctioned lists). In addition, the flagged sources 205 can also include various types of public records that indicate different types of publicly available information that may indicate potential derogatory information (e.g., arrests, criminal convictions, citations, fines, offenses). In addition, the flagged sources 205 can also include information that is not publicly available but may still indicate derogatory information (e.g., information that is collected by a government entity and/or a government authorized entity).

As shown, the entity comparison module 214 generates match results 206b indicating that the individual "JOHN DOE" was present in the "public criminal records" list but the company "JOHN DOE'S AUTOBODY LLC" was not identified within any of the lists within the flagged sources 205. As described above, in some implementations, the detected presence of "JOHN DOE" in the "PUBLIC RECORDS" list can automatically be used by the aggregator 230 to assign a high priority indicator because the public records represent an objective indication of derogatory information.

In some implementations, the entity comparison module 214 is capable of identifying additional entities that are associated with the search query 202 but are not indicated and/or included within the document information 202a. For example, if the company "JOHN DOE'S AUTOBODY LLC" has changed from a sole proprietorship to a partnership that includes Joseph Doe, the entity comparison module 214 may identify Joseph Doe as another target entity associated with the search query 202. In such implementations, the query processor 210 may perform additional operations for the newly identified entity. For example, the query processor 210 may identify entity attributes for the new entity and transmit these entity attributes for processing by the learning modules 212 as shown by the dotted arrow in the figure.

With respect to the third pathway, the query processor 210 identifies the entity names 206a associated with the search query 202. The query processor 210 also identifies the names of related entities 208a, which include entity names that are similar to the entity names 206a, such as "JOHNSON DOE" and "JOE'S AUTOBODY LLC," as well as entity names that are identical but refer to a different individual, such as "JOHN DOE" a famous actor. The entity names 206a and the names of related entities 208a are provided as input to the commonality module 216.

The commonality module 216 can use techniques to determine the commonality of each of the entity names included within the entity names 206a. In the example depicted, the commonality module 216 utilizes the statistical model 218, which specifies frequency scores reflecting respective likelihoods of particular entity terms occurring in, for example, a given document. As shown, the entity "JOHN DOE" has a frequency score of "0.93," which has a higher value than the frequency score of "0.61" for the entity "JOHN DOE'S AUTOBODY LLC." In this example, the commonality module 216 determines that the "JOHN DOE" is more likely to be present in a given document because of its association with a celebrity. Based on these scores, the commonality module 216 also determines that "JOHN DOE" is also more likely to occur in a document than "JOHN DOE'S AUTOBODY LLC."

The commonality module 216 then determines the reliability scores 208b for each of the entity names 206a. As shown, the commonality module 216 determines a reliability score value of "0.30" for the entity name "JOHN DOE" and a reliability score value of "0.56" for the entity name "JOHN DOE'S AUTOBODY LLC." In this example, the reliability score for "JOHN DOE" is lower than the reliability score for "JOHN DOE'S AUTOBODY LLC" because the statistical model 218 indicates that "JOHN DOE" is more frequently occurring than "JOHN DOE'S AUTOBODY LLC," increasing the likelihood that a particular occurrence of "JOHN DOE" in a given document may actually be associated with another entity that is not the target entity (e.g., "JOHN DOE" the actor included in the name of related entities 208a).

With respect to the fourth pathway, the query processor 210 obtains a collection of documents 209a that are determined by a search engine to be responsive to the search query 202. In the example depicted, the collection of documents 209a include four webpages that include text associated with a text segment of the search query 202. The collection of documents 202 are then provided for output to the post-processor 220.

Referring now to FIG. 2C, the operations performed by the post-processor 220 are shown. The post-processor 220 receives the reliability scores 208b computed by the commonality module 208b, and the collection of documents 209a obtained by the search engine, as input. In this example, the collection of documents 209a includes individual documents 252a, 252b, 252c, and 252d.

The post-processor 220 processes the content within each document in relation to the reliability scores 208b for each entity name in order to compute reliability scores for the documents 252a, 252b, 252c, and 252d. As described above, the post-processor 220 may use a variety of natural language processing and/or machine learning techniques to identify the reliability of each individual document (e.g., a likelihood that an identified portion of the document actually references the target entity).

For example, post-processor 220 computes a reliability score of "0.40" for the document 252a because the identified portion actually corresponds to a different "JOHN DOE" than the target entity "JOHN DOE." In this example, this determination can be based on identifying the topic of the identified portion, which relates to foreign policy and unlikely to be related to the target entity based on the entity attributes determined by the query processor 210. In another example, the post-processor 220 computes a reliability score of "0.10" for document 252c because the identified portion includes text segments "JOHN" and "DOE," but the context of the sentence indicates that the instances do not represent entity terms (e.g., a term that corresponds to a name of an individual, a company, or other type of entity). For example, an entity term "JOHN" in a name field corresponds to the name of an individual name John, whereas a term "JOHN" occurring in the sentence "I NEED TO USE THE JOHN" corresponds to a colloquialism that refers to a bathroom.

In comparison, the post-processor 220 computes higher reliability scores for documents 252b and 252d because the identified portions are determined to correspond to entity names associated with the target entities. For instance, the post-processor 220 determines that the identified portions of the documents 252b and 252d actually corresponds to the correct "JOHN DOE" and "JOHN DOE'S AUTOBODY LLC," respectively. In this example, the post-processor 220 identifies a higher reliability score for the document 252d than for the document 252b, because the context of the identified portion of the document 252b indicates that its topic relates to food courts (not likely to be relevant to a negative media search), whereas the context of the identified portion of the document 252d indicates that its topic relates to "BORDER CRIME BLOG," an Internet blog that publishes reports on the Mexican cartel drug war (more likely to be relevant to a negative media search).

In some implementations, the post-processor 220 computes reliability scores for the documents 252a, 252b, 252c, and 252d based on the reliability scores 208b for entity names. For instance, the post-processor 220 may reduce the reliability scores computed for documents that include portions corresponding to the entity name "JOHN DOE" because the reliability score for the name is low, which increases the likelihood that a given document actually includes portions that correspond to a similarly sounding entity name. In other examples, the reliability scores 208b can be used as a specified weight in computing the reliability scores for the documents 252a, 252b, 252c, and 252d as described above.

The post-processor 220 filters the collection of documents 209a based on the computed reliability scores. In the example depicted, the post-processor 220 applies a thresholding technique that selects a subset of the collection of document 209a that have respective reliability scores that exceed a predetermined threshold. For example, the post-processor 220 selects the documents 252b and 252d to include within the filtered documents 206b because their corresponding reliability scores satisfy a predetermined threshold value of "0.50." In some implementations, the post-processor 220 may use other types of suitable selection and/or filtering techniques to select the filtered documents 206b from among the collection of documents 209a. The post-processor 220 then provides the reliability scores 208b and the filtered documents 206b for output to the aggregator 230.

Referring now to FIG. 2D, the exemplary operations performed by the aggregator 230 are shown. The aggregator 230 receives the concept scores 204b and the match results 206b from the query processor 210, and the reliability scores 208b and the filtered documents 206b from the post-processor 220, as input. The aggregator 232 also receives domain criteria 232 that identifies a particular domain and enables the computation of the priority indicator 242 for each entity.

As described above, the priority indicator 242 computed for an entity reflects a likelihood that the results of a negative media search include derogatory information that are relevant to the domain specified by the domain criteria 232. In this regard, the aggregator 230 uses the domain criteria 232 to differentiate between non-specific identified derogatory information that is unrelated to the domain criteria 232 and identified derogatory information that is likely to be of interest to an end-user that receives the negative media search results.

In the example depicted, the domain criteria 232 specifies a "ANTI-MONEY LAUNDERING" domain. In this example, other types of derogatory information, for instance, data associated with the concept criterion "SEX OFFENDER" are less likely to be relevant to the specified domain, whereas concept criteria "DRUG ARRESTS" and "BANKRUPTCY" are more likely to be relevant to the domain criteria 232. These determinations can be based on training data indicating that individuals that are classified as sex offenders are unlikely to be associated with money laundering activities, whereas individuals that have been arrested for drug offenses or individuals/entities have filed for bankruptcy are more likely to be associated with money laundering activities.

The aggregator 230 uses the domain criteria 232 to adjust the relative weighting of the concept scores 204b in computing the priority indicators 242 for the target entities. For example, the aggregator 230 generates a domain weight 234 for each concept criteria associated with the concept scores 204b. As depicted, the domain weight for the concept criterion "SEX OFFENDER" is determined to be "0.6," whereas the domain weight for the concept criteria "DRUG ARRESTS" and "BANKRUPTCY" are determined to be higher at "1.50" and "2.0," respectively, due to a higher likelihood of relevancy to the specified domain. In this example, the value of a domain weight represents a degree of relevancy of a corresponding concept criteria to the domain specified by the domain criteria 232 (e.g., a higher value indicating a higher degree of relevancy).

The aggregator 230 then applies the domain weights 234 in combining various types of input data and computing a domain-specific priority indicator 234 for each target entity. In the first example, the aggregator 230 computes a priority indicator with a value of "100" for the entity "JOHN DOE" because the match results 206b indicates that the entity name was present in a flagged source of "PUBLIC RECORDS." As described above, this presence indicates a high likelihood that at least some of the negative media search will include derogatory information that is relevant to the domain specified by the domain criteria 232.

In the other example, the aggregator 230 computes a priority indicator with a value of "84" for the entity "JOHN DOE'S AUTOBODY LLC." In this example, the priority indicator value is lower than the priority indicator value computed for the first example because the match results 206b do not include a list presence for the entity within one of the flagged sources 205. The aggregator 230, in this example, determines that the lack of a list presence fails to provide a strong objective indication that at least some of the negative media search will include derogatory information that is relevant to the domain specified by the domain criteria 232. The value of the priority indicator in the second example is still nonetheless higher than a value of "50" because the concept score 204b for the concept criteria "BANKRUPTCY" is high (e.g., a value of "0.8") and the domain weight for bankruptcy is also high (e.g., a value of "0.84"). Thus, while the negative media search results might not indicate an objective indication of derogatory information, the results may nonetheless be of interest to an end-user.

As described above, in addition to computing the priority indicator 242 for each entity, the aggregator 230 can perform other types of operations. In the example depicted in FIG. 2D, the aggregator 230 computes the priority sub-scores 206c, which in this example, represent concept scores that are adjusted for the domain specified by the domain criteria 232. In this example, aggregator 230 multiplies a baseline value of a concept score within the concept scores 204b with its corresponding domain weight within the domain weights 234 to compute an adjusted concept score within the priority sub-scores 206c. For instance, an adjusted concept score for "SEX OFFENDER" for "JOHN DOE" is "0.18" based on multiplying a value of "0.3" and "0.6."

The aggregator 230 also processes the content within the filtered documents 209b and selects the documents that are likely to include derogatory information that is relevant to the domain specified by the domain criteria 232. In the examples depicted, the aggregator 230 processes the identified portions of documents 254a and 254b in relation to the domain specified by the domain criteria 232.

For instance, the aggregator 230 determines that the document 254a is a document that is likely to have relevant derogatory information because its content relates to a possible association between a target entity and Mexican drug cartel activity, which is relevant to the specified domain of "ANTI-MONEY LAUNDERING." In contrast, the aggregator 230 determines that the document 254b is a document that is not likely to have relevant derogatory information because its content relates to a food court (as opposed to a court of law), which is unlikely to be relevant to the specified domain.

The example illustrated in FIGS. 2A-2D represent a negative media search conducted for an individual and an associated company in the United States. The illustrated techniques, however, can be applied in other appropriate territories based on obtaining information that is used to evaluate the obtained information for a target entity (e.g., the behavioral models 212a, the flagged sources 205, etc.).

The examples in FIGS. 2A-2D illustrates an example of the priority indicator 242 that is an aggregate value that is computed based on combining multiple scores (e.g., the concept scores 204b, the reliability scores 208b, and/or the reliability scores of the filtered webpages 209b) using various techniques as described above. However, in other implementations, the priority indicator 242 can instead be represented as a qualitative representation of the likelihood that the negative media search results for a target entity includes potential derogatory information. For example, in such implementations, the priority score 242 can be represented one of as "HIGH," "MEDIUM," and "LOW," depending on a determined likelihood that the negative media search results potentially include derogatory information.

FIGS. 3A-3C are diagrams that illustrate examples of user interfaces 300A-300C associated with a client portal for reviewing negative media search results. Referring initially to FIG. 3A, the interface 300A depicts a page where the end-user 104 can review and analyze negative search result data for one or more batch uploads. The interface 300A includes interface elements 302, 304, 306, and 308 at the top of the page to enable a user to navigate to different pages of the client portal 130, manage different data batch uploads, add information for a new entity, or import data from a prior negative media search conducted either by the application server 110 or a third-party software.

A "batch" refers to a set of negative media searchers that are performed by the system 100 during a single search session. For example, a single batch can include a list of different target entities that the end-user 104 has identified as requiring a negative media search. Data from a batch upload is made viewable on the interface 300A on the batch table 314. The batch table 314 includes an entity name, a batcher identifier, a status, time stamp information for updates, and the priority indicator that is calculated for each entity using techniques described previously with respect to FIG. 2A. Each row within the batch table 314 relates to a different negative media search that was run for a target entity. In some instances, multiple negative media searches can be run for the same target entity (e.g., searches directed to different types of derogatory information, multiple instances of the same search criteria over a period of time, etc.). In such instances, different rows within the data table 314 are used to visualize data from the different searches.

The interface 300A also includes a set of filters 310 that can be used to adjust the visualization of data included within a data table 314. For example, as depicted in FIG. 3A, a user can adjust a data range, sort the data table 314 by the entity name, filter the data table 314 by a particular status, or display records with a specified range of priority indicators (e.g., 70-100). The user interface 300A dynamically adjusts the records viewable within the data table 314 based on the user-specified values for the filters 310. The interface 300A additionally includes a visualization 312 that depicts a priority indicator distribution for the data visualized within the data table 314. The visualization 312 is dynamically adjustable 312 based on the user input provided in the filters 310 such that the visualization 312 provides a real-time depiction of the data that is currently included within the data table 314. Although FIG. 3A depicts the visualization 312 as a distribution, in other implementations, the visualization 312 can be any type of data analytics visualization that is generated based on the information included within the data table 314.

In the example depicted in FIG. 3A, negative media searches for different entities from the same batch are visualized in the data table 314. For instance, the batch has an identifier of "2016-0002-0001" which was uploaded to client portal 130 on Feb. 21, 2016 at 9:02 PM. The data table 314 also specifies different review statuses associated with each individual search based on the review/investigation progress made by the end-user 104. In addition, the data table 314 sorts the rows in descending order by the priority indicator. In this example, the entity "TRADE & CLEAR LTD." is identified to have a priority indicator of 100, indicating that this entity has the highest likelihood of having search results that include at some derogatory information. In contrast, the entity "ABDUR REHMAN" has an entity score of 24, indicating a lower likelihood that the search results include some type of derogatory information.

Referring now to FIG. 3B, the interface 300B depicts a page where the end-user 104 can review the most relevant search results obtained for a single entity. The interface 300B includes tabs 352 and 354 that enable an end-user 104 to navigate between different pages, and see an overview of the search results to be reviewed. The interface 300B also includes demographic information tab 356 that includes entity information for a target entity for which a negative media search was ran on, a search results section 358 and a reviewed section 364 that allow an end-user to review a set of relevant search result summaries 362 and view reviewed web results 366, respectively.

The search results section 358 provides a set of relevant web page summaries 362 that are determined to be the most likely to include pertinent information in order to assist an end-user 104 to determine whether there is potentially any derogatory information of interest associated with the target entity. In some instances, the relevant webpage summaries 362 can include information for each of the list of most relevant documents 209c that are outputted by the aggregator 230 as described previously with respect to FIG. 2. For example, using techniques previously described, the system 100 determines that these webpages are the webpages that have most likely contributed to the priority indicator based on the information associated with the entity within the webpage.

Each relevant webpage summary 362 specifies a title of the webpage, a snippet representing the webpage, a URL with a hyperlink that directs the end-user to the webpage, and an extracted text fragment that highlights content that was determined to be associated with the target entity. In the example depicted, the first webpage summary 362 provides webpage information for a list of entities sanctioned by the U.S. Department of Treasury for international synthetic trafficking. In this example, this webpage was selected as a relevant reference because it provides information related to illicit activities (e.g., drug trafficking), which can be used by the end-user 102 to determine that the search results include derogatory information.

After reviewing the information included in the relevant webpage summary 362, the end-user 102 can provide an indication of the relevance of the webpage included within the summary with the use of designation buttons 360. The designation buttons 360 enable an end-user to indicate whether a search result that is determined by the system 100 to be relevant, using techniques described previously with respect to FIG. 2A, is actually considered to be relevant to the negative media search by the end-user 104. In the example depicted, the designation buttons 360 specify an option for a positive indication that identifies the webpage as "relevant" (e.g., thumbs up button), a negative indication that identifies the webpage as "not relevant" (e.g., thumbs down button), and an unclear indication that either identifies the webpage as requiring "further research" or "unable to be determined."

Once the user provides a selection on one of the designation buttons 360, the interface 300B is then updated such that the location of the previously reviewed relevant webpage summary 362 is updated from the search results section 358 to the reviewed section 364. The reviewed section 364 includes a categorized list of reviewed web page sections 366 so that the end-user 104 can filter the list of reviewed web pages by button selection.

In some implementations, the user inputs provided on the interface 300B are used to intelligently track the performance of the domain-specific negative media search techniques described previously with respect to FIGS. 1 and 2A-2D. For instance, the user indications of "relevant" and "not relevant" or "unclear" using the designation buttons 360 can be used to compute a quality score that depicts the accuracy of the selection process for the most relevant documents 209c, as described with respect to FIG. 2A, for display on the user interface 300B. For example, a high percentage of webpages with "relevant" designations by the end-user on the interface 300B can be used to indicate that the negative media search was successful, whereas a high percentage of "not relevant" designations by the end-user can be used to indicate that the negative search media not likely successful.

In some implementations, the user-specific relevancy designations can be clustered with end-users that are determined to be similar with one another (e.g., clustered by organization, industry, type of information requested, etc.) in order to gather insights associated with a particular domain shared by the cluster of users. For example, as described previously, the quality metrics computed for negative media search techniques can be used to types of web pages that are most commonly determined to be "relevant" by multiple end-users, identify search criteria or parameters that lead to highly analogous relevancy results (e.g., relevancy determined automatically using analysis of the content within the webpage vs. relevancy determined by user designations on the interface 300B), among other insights. In this regard, a domain-specific index can be trained over trained over time to provide customized search parameters for unique applications of negative media searches for particular end-users or groups of end-users.

Referring now to FIG. 3C, the visualization 300C depicts an exemplary priority indicator distribution for a plurality of entities within a single data batch upload. For instance, the vertical axis specifies the number of entities, within a group of entities, that share a particular priority indicator, whereas the horizontal axis specifies the full range of score values from the lowest value to the highest value.

As described previously, the visualization 300C can be provided on the interface 300A in order to enable a user to view the number of users that have certain priority indicators. As a result, priority indicator distribution provides the end-user 104 with a high-level snap shot of the types of effort required to review large numbers of entities in order to more efficiently direct resources toward analyzing borderline cases (e.g., entities with priority indicators between 30-50) instead of manually spending time determining and analyzing information for entities with extremely high priority indicators (e.g., entities likely to have derogatory information), or entities with extremely low priority indicators (e.g., entities unlikely to have any derogatory information), which usually require less review effort in order to make a final decision.

Figure 4A:
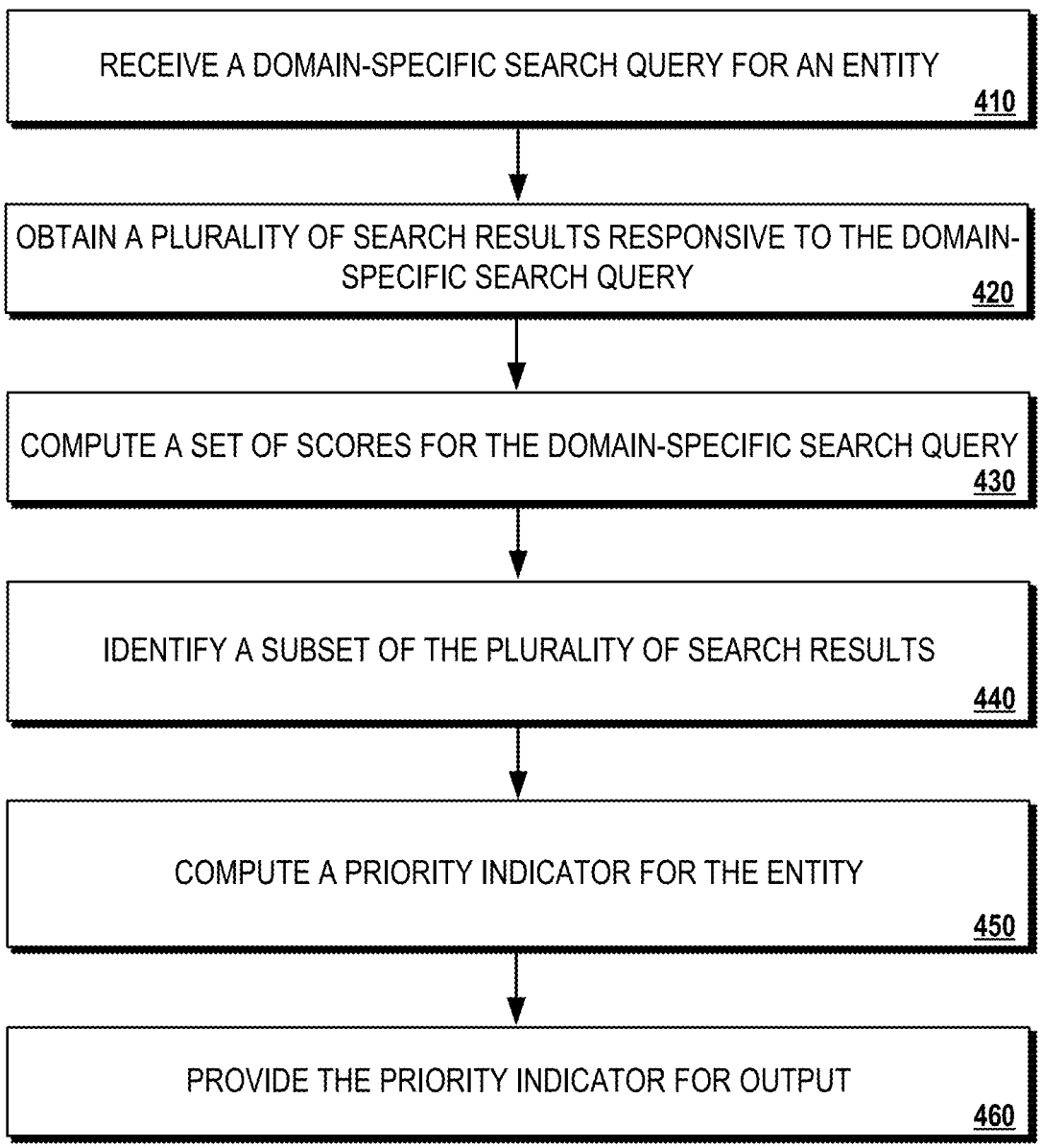
FIGS. 4A-4B illustrate examples of processes for computing a priority indicator for an entity.

FIG. 4A is illustrates an example of a process 400A for computing a priority indicator for an entity. Briefly, the process 400A can include receiving a domain-specific search query for an entity (410), obtaining a plurality of search results responsive to the domain-specific search query (420), computing a set of scores for the domain-specific search query (430), identifying a subset of the plurality of search results (440), computing a priority indicator for the entity (450), and providing the priority indicator for output (460).

In more detail, the process 400A can include receiving a domain-specific search query for an entity (410). For instance, the query processor 210 receives the domain-specific input search query 202 that identifies a particular entity. As described above, the domain of the input query 202 can specify a corpus of documents predetermined to satisfy one or more criteria associated with a negative media search that is performed by a user (e.g., the end-user 104). For example, the one or more criteria can be specific constraints based on the particular type of entity being searched, or regulatory or investigative requirements for a particular end-user 104 requesting the negative media search. In this regard, the corpus of documents is all predetermined to be relevant to a negative media search to be performed based on the received input search query 202.

The process 400A can include obtaining a plurality of search results responsive to the domain-specific search query (420). For instance, after receiving the input search query 202, the query processor 210 searches the corpus of documents and identifies a collection of documents 209a within the corpus of documents that are responsive to the input search query 202 (e.g., documents that include text fragments that are similar or identical to the text included in the input search query 202). The query processor 210 then obtains content from the collection of documents 209a. As described previously, the content can represent text fragments that include text from the input query 202, text fragments that are determined to be associated with entity information but does not include text from the input query 202, or other types of identifying information extracted from webpages or documents included within the collection of documents 209a.

The process 400A can include computing a set of scores for the domain-specific search query (430). For instance, as described previously with respect to FIG. 2A, the set of scores can include the concept scores 204b and the reliability scores 208b. The concept scores 204b can be used to indicate respective affinities between the entity attributes 204a and predetermined attributes associated with one or more reference entities. As described previously, each individual concept score indicates a degree of similarity between an applicable entity attribute and the attributes of two opposite entities within a single concept pair. In addition, the reliability scores 208b for each of the collection of documents 209a can be used to indicate whether content extracted from a particular webpage 209a accurately represents the entity.

The process 400A can include identifying a subset of the plurality of search results (440). For instance, after obtaining the collection of documents 209a, the post-processor 220 can identify the set of filtered documents 209b having reliability scores with values greater than a threshold value, indicating that these webpages have satisfy a threshold relevance to be of-interest to the end-user 104. Additionally, in some implementations, the post-processor 220 can filter the plurality of documents 209a based on the values of the concept scores 204b and/or the match results 206b from the entity comparison module 214. For example, if the match results 206b indicate that the target entity has been identified within one or more of the flagged sources 205, documents that correspond to the flagged sources may be selected and included within the filtered documents 209b. In another example, the concept scores 204b can be used to identify specific types of information (e.g., financial activity, criminal history, presence on a sanctioned list) that are determined have a greater priority than others. In this example, the prioritized information can then be used to filter the filtered documents 209b to select documents that include the specific types of prioritized information.

The process 400A can include computing a priority indicator for the entity (450). For instance, the aggregator 230 can compute a priority indicator 242 based on combining the respective values of the concept scores 204b using specific weighing factors based on the updated match results 206b and the content of the filtered documents 209b. The specific weighting factors can be customized for the domain associated with the input search query 202 or the end-user 104 such that the exact computation of the priority indicator is precisely and uniquely determined for a specific type of negative media search performed for the particular entity. For example, if an end-user that is an AML investigator at a banking institution, the weighting factors can adjusted to positively bias concept scores relating to financial transactions and indicators associated with the target entity, and the reliability scores 208b associated with the filtered documents 209b that are more relevant to financial information can also be positively increased such that the content associated with these documents are more likely to contribute to the priority indicator 242.

The process 400A can include providing the priority indicator for output (460). For instance, the compute priority indicator 242 can be provided on the user interface 300A of the client portal 130. In some implementations, the priority indicator 242 can be periodically updated based on multiple batch uploads that include the same target entities. In such implementations, priority indicators from multiple batch uploads can be used to track the different priority indicators computed for a particular target entity over a period of time. For example, if the end-user 104 is interested in tracking behaviors of a particular entity that are associated with seasonal shifts, periodic computations of the priority indicator, determined based on running independent negative media search queries for the same target entity at different time points, can be used to determine changes in web-based activities.

Figure 4B:
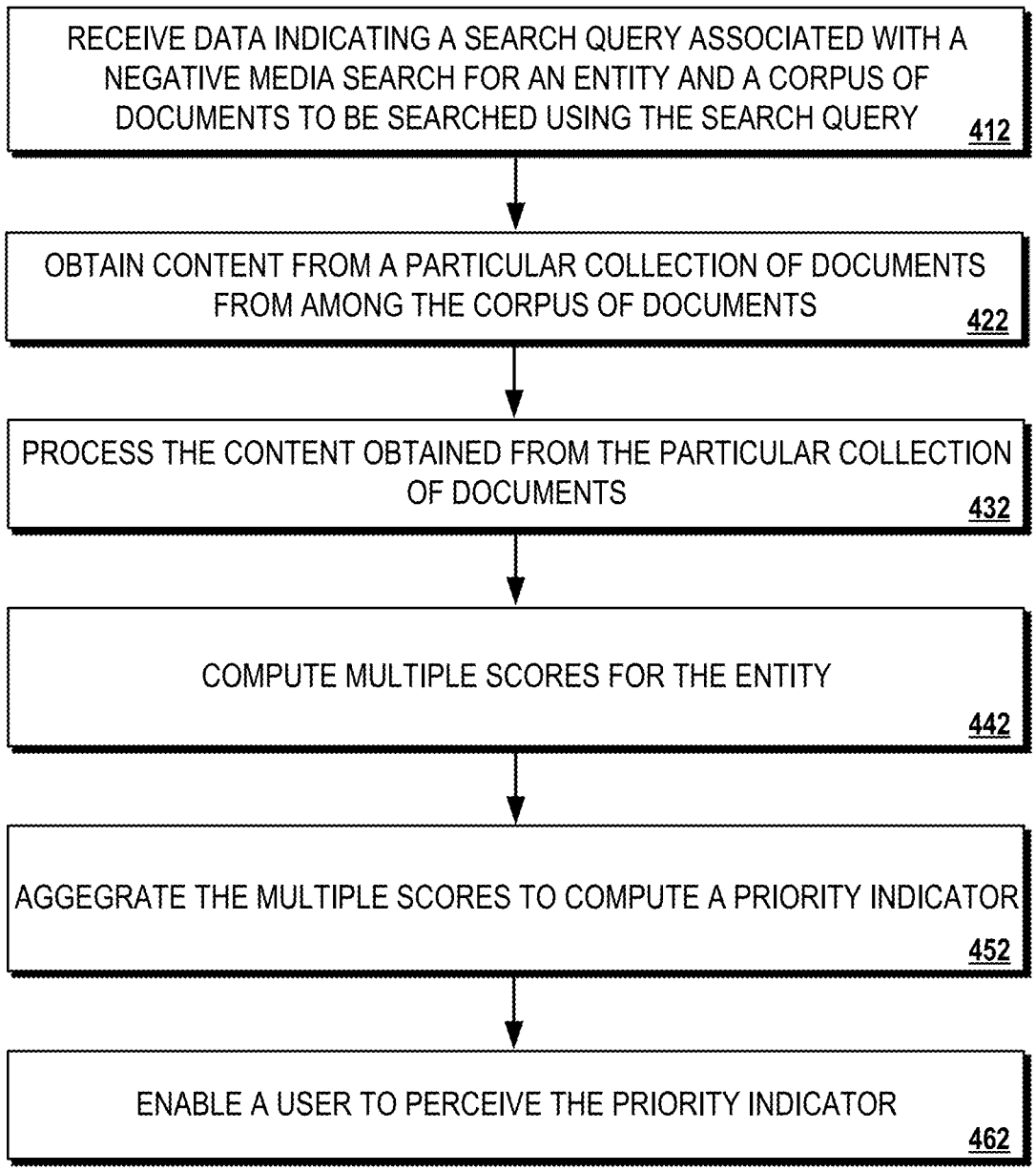

FIG. 4B illustrates an example of a process 400B for computing a priority indicator for an entity. Briefly, the process 400B can include receiving data indicating a search query associated with a negative media search for an entity and a corpus of documents to be searched using the search query (412), obtaining content from a particular collection of documents from among the corpus of documents (422), processing the content obtained from the particular collection of documents (432), computing multiple scores for the entity (442), aggregating the multiple scores to compute a priority indicator (452), and enabling a user to perceive the priority indicator (462).

In more detail, the process 400B can include receiving data indicating a search query associated with a negative media search for an entity and a corpus of documents to be searched using the search query (412). For instance, in the example illustrated in FIGS. 2A-2D, the query processor 210 may obtain data indicating the input search query 202 associated with a negative media search for a target entity. The query processor 210 may also obtain a corpus of documents to be searched using the input search query 202. The corpus of documents can include documents that are predetermined to satisfy one or more criteria associated with the negative media search for the target entity. As described above, a corpus of documents includes documents that are each all associated with a specific domain (e.g., anti-money laundering).

The process 400B can include obtaining content from a particular collection of documents from among the corpus of documents (422). For instance, in the example illustrated in FIGS. 2A-2D, the query processor 210 may obtain content from the collection of documents 209a from among the corpus of documents. As described above, the collection documents 209a can represent documents included within the corpus of documents that are determined to be responsive to the received search query 202. For example, a document may be determined to be responsive if it includes one or more text fragments that corresponds to a name of an entity.

The process 400B can include processing the content obtained from the particular collection of documents (432). For instance, in the example illustrated in FIGS. 2A-2D, the query processor 210 may process the content obtained from the collection of documents 209a. As an example, the query processor 210 may process text fragments of documents included within the collection of documents 209a to determine a reliability of the documents. In some implementations, the post-processor 220 computes reliability scores for the documents included within the collection of documents 209a.

The process 400B can include computing multiple scores for the entity (442). For instance, in the example illustrated in FIGS. 2A-2D, the system computers various scores for information associated with the target entity specified by the search query 202. In particular, the query processor computes the concept scores 204b, the post-processor 220 computes the reliability scores 208b for the target entity names and reliability scores for documents included within the collection of documents. The aggregator 230 additionally computes the domain weights 234 for the concept criteria associated with the concept scores 204b. In other examples, the system can compute additional scores that are not depicted in FIGS. 2A-2D.

The process 400B can include aggregating the multiple scores to compute a priority indicator (452). For instance, in the example illustrated in FIGS. 2A-2D, the aggregator 230 obtains the domain criteria 232 associated with the search query 202 and generates the domain weights 234 for the concept criteria associated with the concept scores 204b. The aggregator 230 combines the various scores computed in step 442 using various techniques to compute the priority indicator 242. As an example, the aggregator applies a weighing factor to each computed concept score based on the domain weights of its corresponding concept criteria and then combines the each of concept scores for a target entity. In some implementations, the aggregator aggregates the information associated with the concept scores 204b, the match results 206b, the reliability scores 208b, and the filtered documents 209b to compute the priority indicator 242 in a manner that is illustrated in FIG. 2D.

The process 400B can include enabling a user to perceive the priority indicator (462). For instance, the aggregator 230 provides the computed priority indicator 242 for each target entity for output. The priority indicator 242 can be displayed on the client portal 130, which is provided for output by the client device 120. The end-user 104 can then perceive the priority indicators 242 on the client portal 130 to perform various operations as described above with respect to FIGS. 3A-3C.

Figure 5:
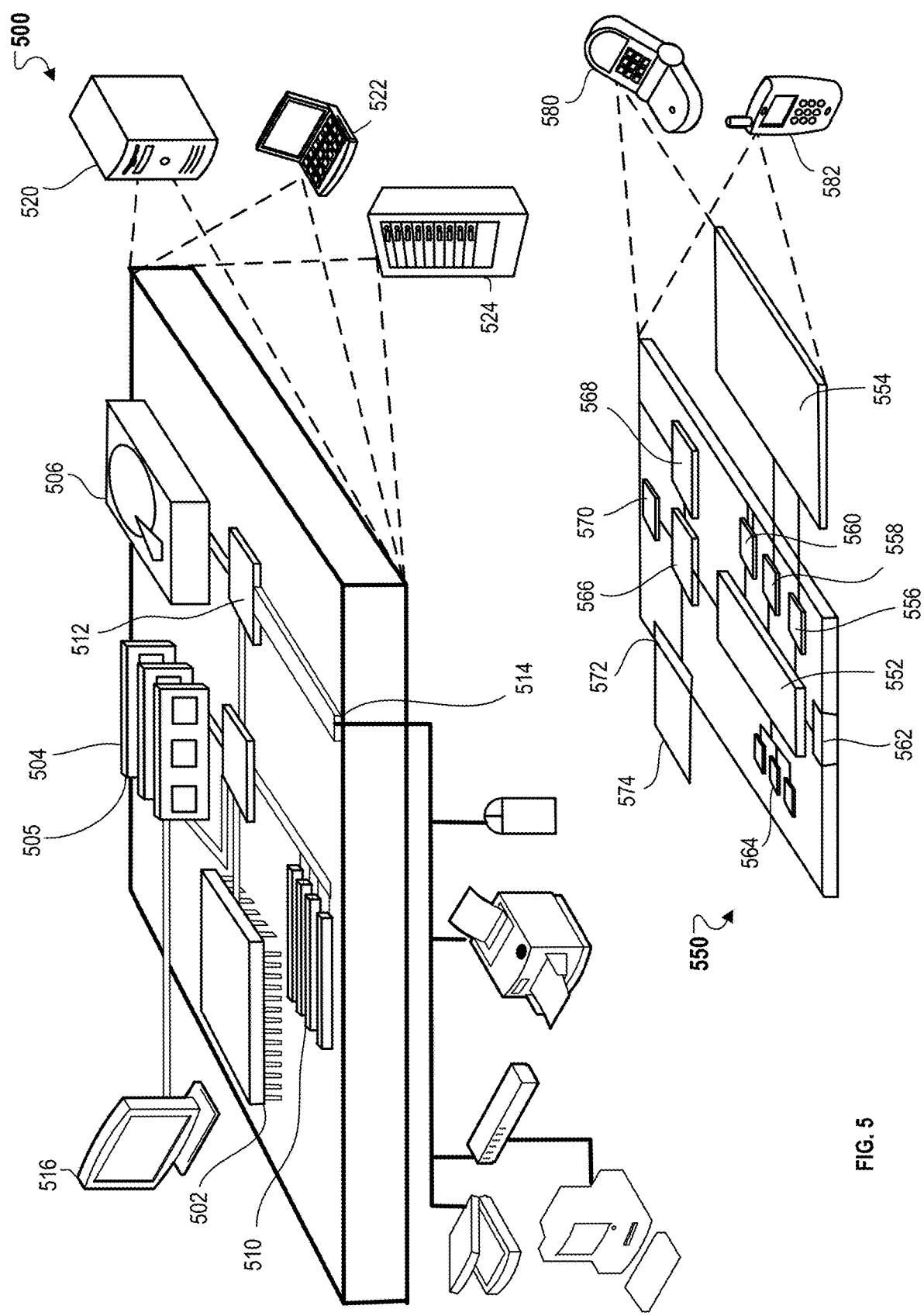
FIG. 5 is a block diagram of computing devices on which the processes described herein, or portions thereof, can be implemented.

FIG. 5 is a block diagram of computing devices 500, 550 that can be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. Additionally, computing device 500 or 550 can include Universal Serial Bus (USB) flash drives. The USB flash drives can store operating systems and other applications. The USB flash drives can include input/output components, such as a wireless transmitter or USB connector that can be inserted into a USB port of another computing device. The components shown here, their connections and relationships, and their functions, are meant to be exemplary only, and are not meant to limit implementations of the inventions described and/or claimed in this document.

Computing device 500 includes a processor 502, memory 504, a storage device 508, a high-speed interface 508 connecting to memory 504 and high-speed expansion ports 510, and a low speed interface 512 connecting to low speed bus 514 and storage device 508. Each of the components 502, 504, 508, 508, 510, and 512, are interconnected using various busses, and can be mounted on a common motherboard or in other manners as appropriate. The processor 502 can process instructions for execution within the computing device 500, including instructions stored in the memory 504 or on the storage device 508 to display graphical information for a GUI on an external input/output device, such as display 516 coupled to high speed interface 508. In other implementations, multiple processors and/or multiple buses can be used, as appropriate, along with multiple memories and types of memory. Also, multiple computing devices 500 can be connected, with each device providing portions of the necessary operations, e.g., as a server bank, a group of blade servers, or a multi-processor system.

The memory 504 stores information within the computing device 500. In one implementation, the memory 504 is a volatile memory unit or units. In another implementation, the memory 504 is a non-volatile memory unit or units. The memory 504 can also be another form of computer-readable medium, such as a magnetic or optical disk.

The storage device 508 is capable of providing mass storage for the computing device 500. In one implementation, the storage device 508 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The information carrier is a computer- or machine-readable medium, such as the memory 504, the storage device 508, or memory on processor 502.

The high speed controller 508 manages bandwidth-intensive operations for the computing device 500, while the low speed controller 512 manages lower bandwidth intensive operations. Such allocation of functions is exemplary only. In one implementation, the high-speed controller 508 is coupled to memory 504, display 516, e.g., through a graphics processor or accelerator, and to high-speed expansion ports 510, which can accept various expansion cards (not shown). In the implementation, low-speed controller 512 is coupled to storage device 508 and low-speed expansion port 514. The low-speed expansion port, which can include various communication ports, e.g., USB, Bluetooth, Ethernet, wireless Ethernet can be coupled to one or more input/output devices, such as a keyboard, a pointing device, microphone/speaker pair, a scanner, or a networking device such as a switch or router, e.g., through a network adapter. The computing device 500 can be implemented in a number of different forms, as shown in the figure. For example, it can be implemented as a standard server 520, or multiple times in a group of such servers. It can also be implemented as part of a rack server system 524. In addition, it can be implemented in a personal computer such as a laptop computer 522. Alternatively, components from computing device 500 can be combined with other components in a mobile device (not shown), such as device 550. Each of such devices can contain one or more of computing device 500, 550, and an entire system can be made up of multiple computing devices 500, 550 communicating with each other.

The computing device 500 can be implemented in a number of different forms, as shown in the figure. For example, it can be implemented as a standard server 520, or multiple times in a group of such servers. It can also be implemented as part of a rack server system 524. In addition, it can be implemented in a personal computer such as a laptop computer 522. Alternatively, components from computing device 500 can be combined with other components in a mobile device (not shown), such as device 550. Each of such devices can contain one or more of computing device 500, 550, and an entire system can be made up of multiple computing devices 500, 550 communicating with each other.

Computing device 550 includes a processor 552, memory 564, and an input/output device such as a display 554, a communication interface 566, and a transceiver 568, among other components. The device 550 can also be provided with a storage device, such as a micro-drive or other device, to provide additional storage. Each of the components 550, 552, 564, 554, 566, and 568, are interconnected using various buses, and several of the components can be mounted on a common motherboard or in other manners as appropriate.

The processor 552 can execute instructions within the computing device 550, including instructions stored in the memory 564. The processor can be implemented as a chipset of chips that include separate and multiple analog and digital processors. Additionally, the processor can be implemented using any of a number of architectures. For example, the processor 510 can be a CISC (Complex Instruction Set Computers) processor, a RISC (Reduced Instruction Set Computer) processor, or a MISC (Minimal Instruction Set Computer) processor. The processor can provide, for example, for coordination of the other components of the device 550, such as control of user interfaces, applications run by device 550, and wireless communication by device 550.

Processor 552 can communicate with a user through control interface 558 and display interface 556 coupled to a display 554. The display 554 can be, for example, a TFT (Thin-Film-Transistor Liquid Crystal Display) display or an OLED (Organic Light Emitting Diode) display, or other appropriate display technology. The display interface 556 can comprise appropriate circuitry for driving the display 554 to present graphical and other information to a user. The control interface 558 can receive commands from a user and convert them for submission to the processor 552. In addition, an external interface 562 can be provide in communication with processor 552, so as to enable near area communication of device 550 with other devices. External interface 562 can provide, for example, for wired communication in some implementations, or for wireless communication in other implementations, and multiple interfaces can also be used.

The memory 564 stores information within the computing device 550. The memory 564 can be implemented as one or more of a computer-readable medium or media, a volatile memory unit or units, or a non-volatile memory unit or units. Expansion memory 574 can also be provided and connected to device 550 through expansion interface 572, which can include, for example, a SIMM (Single In Line Memory Module) card interface. Such expansion memory 574 can provide extra storage space for device 550, or can also store applications or other information for device 550. Specifically, expansion memory 574 can include instructions to carry out or supplement the processes described above, and can include secure information also. Thus, for example, expansion memory 574 can be provide as a security module for device 550, and can be programmed with instructions that permit secure use of device 550. In addition, secure applications can be provided via the SIMM cards, along with additional information, such as placing identifying information on the SIMM card in a non-hackable manner.

The memory can include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that can be received, for example, over transceiver 568 or external interface 562.

Device 550 can communicate wirelessly through communication interface 566, which can include digital signal processing circuitry where necessary. Communication interface 566 can provide for communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 568. In addition, short-range communication can occur, such as using a Bluetooth, Wi-Fi, or other such transceiver (not shown). In addition, GPS (Global Positioning System) receiver module 670 can provide additional navigation- and location-related wireless data to device 550, which can be used as appropriate by applications running on device 550.

Device 550 can also communicate audibly using audio codec 560, which can receive spoken information from a user and convert it to usable digital information. Audio codec 560 can likewise generate audible sound for a user, such as through a speaker, e.g., in a handset of device 550. Such sound can include sound from voice telephone calls, can include recorded sound, e.g., voice messages, music files, etc. and can also include sound generated by applications operating on device 550.

The computing device 550 can be implemented in a number of different forms, as shown in the figure. For example, it can be implemented as a cellular telephone 580. It can also be implemented as part of a smartphone 582, personal digital assistant, or other similar mobile device.

Various implementations of the systems and methods described here can be realized in digital electronic circuitry, integrated circuitry, specially designed ASICs (application specific integrated circuits), computer hardware, firmware, software, and/or combinations of such implementations. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor for displaying information to the user and a keyboard and a pointing device, e.g., a mouse or a trackball by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the systems and techniques described here, or any combination of such back end, middleware, or front end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications can be made without departing from the spirit and scope of the invention. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

The invention claimed is:

1. A method performed by one or more computers, the method comprising:
   receiving a search query for an entity, wherein the search query comprises at least (i) a text fragment representing a name of the entity and (ii) a domain-specific index that specifies a first collection of documents predetermined to be associated with a particular negative media domain;
   identifying, using the domain-specific index, a set of documents from among the first collection of documents that are responsive to the search query;
   determining a likelihood of the text fragment being present in a second collection of documents that are not associated with the particular negative media domain;
   computing a commonality score for the entity based on the likelihood determined for the text fragment being present in the second collection of documents;
   computing, for each document included within the set of documents, a reliability score representing a likelihood that information specified by a particular document is associated with the entity, wherein reliability scores for the set of documents are computed based on the commonality score;
   selecting a subset of documents from the set of documents based on reliability scores computed for the set of documents, wherein each document included in the subset of documents has a reliability score satisfying a set of reliability criteria;
   determining a priority indicator for the entity based on information specified by the subset of documents; and
   enabling a user to perceive the priority indicator.

2. The method of claim 1, wherein determining the priority indicator for the entity comprises:
   computing a set of scores for the entity based on information specified by the subset of documents selected from the set of documents; and
   computing the priority indicator for the entity based on combining the set of scores.

3. The method of claim 2, wherein the computing the set of scores comprises computing a set of concept scores for the entity based on information specified by the subset of documents selected from the set of documents, wherein each concept score included in the set of concept scores represents a likelihood that the entity is associated with a predetermined negative attribute of a corresponding reference entity group of a plurality of reference entity groups predetermined to be associated with derogatory information.

4. The method of claim 3, wherein the set of concept scores are computed based at least on determining that the entity is included in a list of sanctioned entities.

5. The method of claim 3, wherein the computing the set of scores comprises computing a set of relevancy scores for the subset of documents selected from the set of documents, wherein each relevancy score included in the set of relevancy scores represents a likelihood that a document included in the subset of documents includes information descriptive of a set of predetermined negative attributes.

6. The method of claim 1, wherein computing a reliability score for a document included in the set of documents comprises:
   identifying one or more text fragments from the document;
   determining one or more topics associated with each of the one or more text fragments; and
   determining a likelihood that at least one of the one or more topics is associated with the entity.

7. The method of claim 1, wherein:
   the set of reliability criteria comprises a predetermined threshold associated with reliability scores computed for the set of documents; and
   the subset of documents includes documents have reliability scores satisfying the predetermined threshold.

8. The method of claim 1, wherein selecting the subset of documents from the set of documents comprises:
   identifying multiple different subsets of documents from the set of documents;
   computing, for each of the multiple different subsets of documents, a reliability score representing a likelihood that information specified by a particular subset of documents is associated with the entity; and
   selecting the subset of documents based on reliability scores computed for the multiple different subsets of documents.

9. The method of claim 8, further comprising:
   obtaining a set of public records specifying information for an entity name associated with the entity;
   determining a portion of the set of public records that uniquely correspond to the entity; and
   wherein the reliability scores for the multiple subsets of documents are computed based on the portion of the set of public records that uniquely correspond to the entity.

10. The method of claim 1, further comprising:
    obtaining a set of public records specifying information for an entity name associated with the entity;
    determining a portion of the set of public records that uniquely correspond to the entity; and
    wherein the reliability scores for the set of documents are computed based on the portion of the set of public records that uniquely correspond to the entity.

11. A system comprising:
    one or more computing devices; and
    one or more non-transitory storage devices storing instructions that, when received by the one or more computing devices, cause the one or more computing devices to perform operations comprising:
       receiving a search query for an entity, wherein the search query comprises at least (i) a text fragment representing a name of the entity and (ii) a domain-specific index that specifies a first collection of documents predetermined to be associated with a particular negative media domain;
       identifying, using the domain-specific index, a set of documents from among the first collection of documents that are responsive to the search query;
       determining a likelihood of the text fragment being present in a second collection of documents that are not associated with the particular negative media domain;
       computing a commonality score for the entity based on the likelihood determined for the text fragment being present in the second collection of documents;
       computing, for each document included within the set of documents, a reliability score representing a likelihood that information specified by a particular document is associated with the entity, wherein reliability scores for the set of documents are computed based on the commonality score;
       selecting a subset of documents from the set of documents based on reliability scores computed for the set of documents, wherein each document included in the subset of documents has a reliability score satisfying a set of reliability criteria;

determining a priority indicator for the entity based on information specified by the subset of documents; and enabling a user to perceive the priority indicator.

12. The system of claim 11, wherein determining the priority indicator for the entity comprises:

computing a set of scores for the entity based on information specified by the subset of documents selected from the set of documents; and computing the priority indicator for the entity based on combining the set of scores.

13. The system of claim 12, wherein the computing the set of scores comprises computing a set of concept scores for the entity based on information specified by the subset of documents selected from the set of documents, wherein each concept score included in the set of concept scores represents a likelihood that the entity is associated with a predetermined negative attribute of a corresponding reference entity group of a plurality of reference entity groups predetermined to be associated with derogatory information.

14. The system of claim 13, wherein the set of concept scores are computed based at least on determining that the entity is included in a list of sanctioned entities.

15. At least one non-transitory computer-readable storage device storing instructions that, when received by one or more computing devices, cause the one or more computing devices to perform operations comprising:

receiving a search query for an entity, wherein the search query comprises at least (i) a text fragment representing a name of the entity and (ii) a domain-specific index that specifies a first collection of documents predetermined to be associated with a particular negative media domain;

identifying, using the domain-specific index, a set of documents from among the first collection of documents that are responsive to the search query;

determining a likelihood of the text fragment being present in a second collection of documents that are not associated with the particular negative media domain;

computing a commonality score for the entity based on the likelihood determined for the text fragment being present in the second collection of documents;

computing, for each document included within the set of documents, a reliability score representing a likelihood that information specified by a particular document is associated with the entity, wherein reliability scores for the set of documents are computed based on the commonality score;

selecting a subset of documents from the set of documents based on reliability scores computed for the set of documents, wherein each document included in the subset of documents has a reliability score satisfying a set of reliability criteria;

determining a priority indicator for the entity based on information specified by the subset of documents; and enabling a user to perceive the priority indicator.

16. The at least one non-transitory computer-readable storage of claim 15, wherein determining the priority indicator for the entity comprises:

computing a set of scores for the entity based on information specified by the subset of documents selected from the set of documents; and computing the priority indicator for the entity based on combining the set of scores.

17. The at least one non-transitory computer-readable storage of claim 16, wherein the computing the set of scores comprises computing a set of concept scores for the entity based on information specified by the subset of documents selected from the set of documents, wherein each concept score included in the set of concept scores represents a likelihood that the entity is associated with a predetermined negative attribute of a corresponding reference entity group of a plurality of reference entity groups predetermined to be associated with derogatory information.

18. The at least one non-transitory computer-readable storage of claim 17, wherein the set of concept scores are computed based at least on determining that the entity is included in a list of sanctioned entities.

19. The at least one non-transitory computer-readable storage of claim 17, wherein the computing the set of scores comprises computing a set of relevancy scores for the subset of documents selected from the set of documents, wherein each relevancy score included in the set of relevancy scores represents a likelihood that a document included in the subset of documents includes information descriptive of a set of predetermined negative attributes.

\* \* \* \* \*